US012110211B2

(12) United States Patent
Nakazawa et al.

(10) Patent No.: US 12,110,211 B2
(45) Date of Patent: Oct. 8, 2024

(54) BREAK DETECTION DEVICE

(71) Applicant: Mitsubishi Electric Corporation, Tokyo (JP)

(72) Inventors: Daisuke Nakazawa, Tokyo (JP); Toshiaki Kato, Tokyo (JP); Daiki Fukui, Tokyo (JP); Hiroyuki Murakami, Tokyo (JP); Satoshi Yamasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1272 days.

(21) Appl. No.: 16/617,019

(22) PCT Filed: Aug. 10, 2017

(86) PCT No.: PCT/JP2017/029054
§ 371 (c)(1),
(2) Date: Nov. 26, 2019

(87) PCT Pub. No.: WO2019/030888
PCT Pub. Date: Feb. 14, 2019

(65) Prior Publication Data

US 2021/0188597 A1 Jun. 24, 2021

(51) Int. Cl.
*B66B 5/02* (2006.01)
*B66B 7/12* (2006.01)
*B66B 1/32* (2006.01)

(52) U.S. Cl.
CPC .............. *B66B 5/02* (2013.01); *B66B 7/1215* (2013.01); *B66B 1/32* (2013.01)

(58) Field of Classification Search
CPC ....... B66B 7/1215; B66B 5/02; B66B 5/0031; B66B 7/06; B66B 1/3492; B66B 5/0037;
(Continued)

(56) References Cited

U.S. PATENT DOCUMENTS

2007/0180925 A1* 8/2007 Stucky .................. G01N 27/20 73/810
2011/0315489 A1* 12/2011 Nakamori ............ B66B 7/1215 73/158
(Continued)

FOREIGN PATENT DOCUMENTS

CN 101811636 A * 8/2010 .............. B66B 5/02
CN 104261225 A * 1/2015 .............. B66B 5/00
(Continued)

OTHER PUBLICATIONS

Office Action issued on Dec. 15, 2020, in corresponding Japanese patent Application No. 2019-535533, 8 pages.
(Continued)

*Primary Examiner* — Marlon T Fletcher
(74) *Attorney, Agent, or Firm* — XSENSUS LLP

(57) ABSTRACT

A break detection device includes an extraction unit (22), an extraction unit (23), a detection unit (24), and a determination unit (26). The extraction unit (22) extracts, from an output signal from a sensor, a vibration component in a specific frequency band. The extraction unit (23) attenuates, from the vibration component extracted by the extraction unit (22), a steady vibration component and a progressively increasing vibration component to extract a determination signal. The detection unit (24) detects, on the basis of the determination signal, occurrence of an abnormal variation in the output signal from the sensor. The determination unit (26) determines whether or not a rope has a broken portion.

14 Claims, 29 Drawing Sheets

(58) Field of Classification Search
CPC .. B66B 5/12; B66B 5/044; B66B 7/02; B66B 11/0065; B66B 15/04; B66B 15/02; B66B 5/24; B66B 9/083
See application file for complete search history.

(56) References Cited

U.S. PATENT DOCUMENTS

| | | | | |
|---|---|---|---|---|
| 2015/0329319 | A1* | 11/2015 | Lehtinen | B66B 5/0031 187/254 |
| 2021/0094801 | A1* | 4/2021 | Evert | B66B 5/0025 |

FOREIGN PATENT DOCUMENTS

| | | | | | |
|---|---|---|---|---|---|
| JP | 08-104473 | A | | 4/1996 | |
| JP | 2007-529390 | A | | 10/2007 | |
| JP | 4896692 | B2 | | 3/2012 | |
| JP | 2012-517391 | A | | 8/2012 | |
| JP | 2012-197181 | A | | 10/2012 | |
| JP | 2016-222420 | A | | 12/2016 | |
| KR | 10-2010-0097023 | A | | 9/2010 | |
| KR | 20100097023 | A | * | 9/2010 | |
| WO | WO-2010092618 | A1 | * | 8/2010 | B66B 7/1215 |
| WO | WO-2011158871 | A1 | * | 12/2011 | B66B 7/1215 |
| WO | WO-2015068322 | A1 | * | 5/2015 | B66B 7/1215 |
| WO | WO-2017022709 | A1 | * | 2/2017 | B66B 7/1215 |
| WO | WO-2017183188 | A1 | * | 10/2017 | G01N 29/24 |
| WO | WO-2017203609 | A1 | * | 11/2017 | B66B 5/0031 |
| WO | WO-2018131145 | A1 | * | 7/2018 | B66B 5/02 |
| WO | WO-2019030888 | A1 | * | 2/2019 | B66B 5/02 |

OTHER PUBLICATIONS

International Search Report and Written Opinion mailed on Oct. 10, 2017 for PCT/JP2017/029054 filed on Aug. 10, 2017, 10 pages including English Translation of the International Search Report.
Office Action issued on Jul. 20, 2021, in corresponding Korean patent Application No. 10-2020-7003017, 10 pages.
Office Action dated Mar. 15, 2021 in the corresponding Indian patent application No. 202047002806.

* cited by examiner

POSITION OF CAR [m]
P
P2
0
t3
TIME [s]
t4

TORQUE OF TRACTION MACHINE [Nm]
Tq1
0
-Tq2
t3
TIME [s]
t4

SPEED DEVIATION [m/s]
0
t3
TIME [s]
t4

LOAD OF CAR [kg]
W
t3
TIME [s]
t4

No. 11 TRACTION MACHINE
No. 12: LOAD WEIGHING DEVICE
No. 13: CONTROLLER
No. 15: GOVERNOR
No. 18: ENCODER
No. 21 STORAGE UNIT
No. 22: EXTRACTION UNIT
No. 23: EXTRACTION UNIT
No. 24: DETECTION UNIT
No. 25: CAR POSITION DETECTION UNIT
No. 26: DETERMINATION UNIT
No. 26-1: REPRODUCIBILITY DETERMINING FUNCTION
No. 26-2: BREAK DETERMINING FUNCTION
No. 27: OPERATION CONTROL UNIT
No. 28: NOTIFICATION UNIT

S101 EXTRACT VIBRATION COMPONENT IN SPECIFIC FREQUENCY BAND
S102: EXTRACT DETERMINATION SIGNAL
S103: DETECT OCCURRENCE OF ABNORMAL VARIATION
S104. DETERMINE PRESENCE OR ABSENCE OF BROKEN PORTION
S104-1. DETERMINE REPRODUCIBILITY
S104-2. DETERMINE BREAK
S105: STOP CAR AT NEAREST FLOOR
S106: NOTIFY

No. 22: EXTRACTION UNIT
No. 24: DETECTION UNIT

No. 22: EXTRACTION UNIT
No. 24: DETECTION UNIT

No. 11 TRACTION MACHINE
No. 12: LOAD WEIGHING DEVICE
No. 13: CONTROLLER
No. 15: GOVERNOR
No. 18: ENCODER
No. 21 STORAGE UNIT
No. 22: EXTRACTION UNIT
No. 23: EXTRACTION UNIT
No. 24: DETECTION UNIT
No. 25: CAR POSITION DETECTION UNIT
No. 26: DETERMINATION UNIT
No. 27' OPERATION CONTROL UNIT
No. 28: NOTIFICATION UNIT
No. 29: ARITHMETIC UNIT

No. 13 CONTROLLER
No. 21 STORAGE UNIT
No. 22: EXTRACTION UNIT
No. 23: EXTRACTION UNIT
No. 24: DETECTION UNIT
No. 25: CAR POSITION DETECTION UNIT
No. 26: DETERMINATION UNIT
No. 26-1 REPRODUCIBILITY DETERMINING FUNCTION
No. 26-2: BREAK DETERMINING FUNCTION
No. 27: OPERATION CONTROL UNIT
No. 28: NOTIFICATION UNIT
No. 30: DETECTION UNIT
No. 31 DETERMINATION UNIT

BREAK DETECTION DEVICE

CROSS-REFERENCE TO RELATED APPLICATION

The present application is based on PCT filing PCT/JP2017/029054, filed Aug. 10, 2017, the entire contents of which are incorporated herein by reference.

FIELD

The present invention relates to a device for detecting a wire break occurred in a rope.

BACKGROUND

Various ropes are used in an elevator apparatus. For example, a car of an elevator is suspended by a main rope in a shaft. The main rope is wound around a sheave such as a driving sheave of a traction machine. The main rope is repeatedly bent with movement of the car. Consequently, the main rope gradually deteriorates. When the main rope has deteriorated, wires included in the main rope are broken. When a large number of the wires are broken, a strand made of the wires twisted together may be broken. In the present application, a strand break is also inclusively referred to as a wire break.

A broken wire protrudes from a surface of the main rope. As a result, when the elevator is operated in a state where the wire is broken, the broken wire comes into contact with a device provided in the shaft.

PTL 1 describes an elevator apparatus. In the elevator apparatus described in PTL 1, a detection member is provided so as to face a main rope. In addition, displacement of the detection member is detected by a sensor. A wire break is detected on the basis of the displacement detected by the sensor.

CITATION LIST

Patent Literature

[PTL 1] JP 4896692 B

SUMMARY

Technical Problem

In an elevator apparatus, for each sheave, a range of a main rope that passes through the sheave is determined in advance. For example, a portion in a certain range of the main rope passes through a driving sheave. The portion that passes through the driving sheave does not necessarily pass through a suspension sheave of a counterweight. Accordingly, when it is attempted to detect a wire break using the sensor described in PTL 1, it is required to mount a sensor at a position of each of the sheaves around which the main rope is wound. For example, when a sensor is mounted at a position of the suspension sheave of the counterweight, a signal line should be connected between the counterweight and a controller. A large number of sensors are required, while a signal line should be led out from each of the sensors, resulting in a problem of a complicated configuration. Particularly in a 2:1 roping elevator apparatus using a large number of sheaves, such a problem is prominent.

The invention is made in order to solve such a problem as described above. An object of the invention is to provide a break detection device capable of detecting occurrence of a wire break using a simple configuration.

Solution to Problem

A break detection device of the present invention comprises a sensor of which an output signal varies when vibration occurs in a rope of an elevator, first extraction means configured to extract, from the output signal from the sensor, a vibration component in a specific frequency band, second extraction means configured to attenuate, from the vibration component extracted by the first extraction means, a steady vibration component and a progressively increasing vibration component to extract a determination signal, first detection means configured to detect, on the basis of the determination signal extracted by the second extraction means, occurrence of an abnormal variation in the output signal from the sensor, and first determination means configured to determine, when the occurrence of the abnormal variation is detected by the first detection means, whether or not the rope has a broken portion on the basis of a position of a car of the elevator at an occurrence time of the abnormal variation.

Advantageous Effects of Invention

A break detection device according to the invention includes first extraction means, second extraction means, first detection means, and first determination means. The first extraction means extracts, from an output signal from a sensor, a vibration component in a specific frequency band. The second extraction means attenuates, from the vibration component extracted by the first extraction means, a steady vibration component and a progressively increasing vibration component to extract a determination signal. The first detection means detects, on the basis of the determination signal, occurrence of an abnormal variation in the output signal from the sensor. When the occurrence of the abnormal variation is detected by the first detection means, the first determination means determines whether or not a rope has a broken portion on the basis of a position of a car of an elevator at an occurrence time of the abnormal variation. The break detection device according to the invention can detect the occurrence of a wire break using a simple configuration.

DESCRIPTION OF EMBODIMENTS

Figure 1:
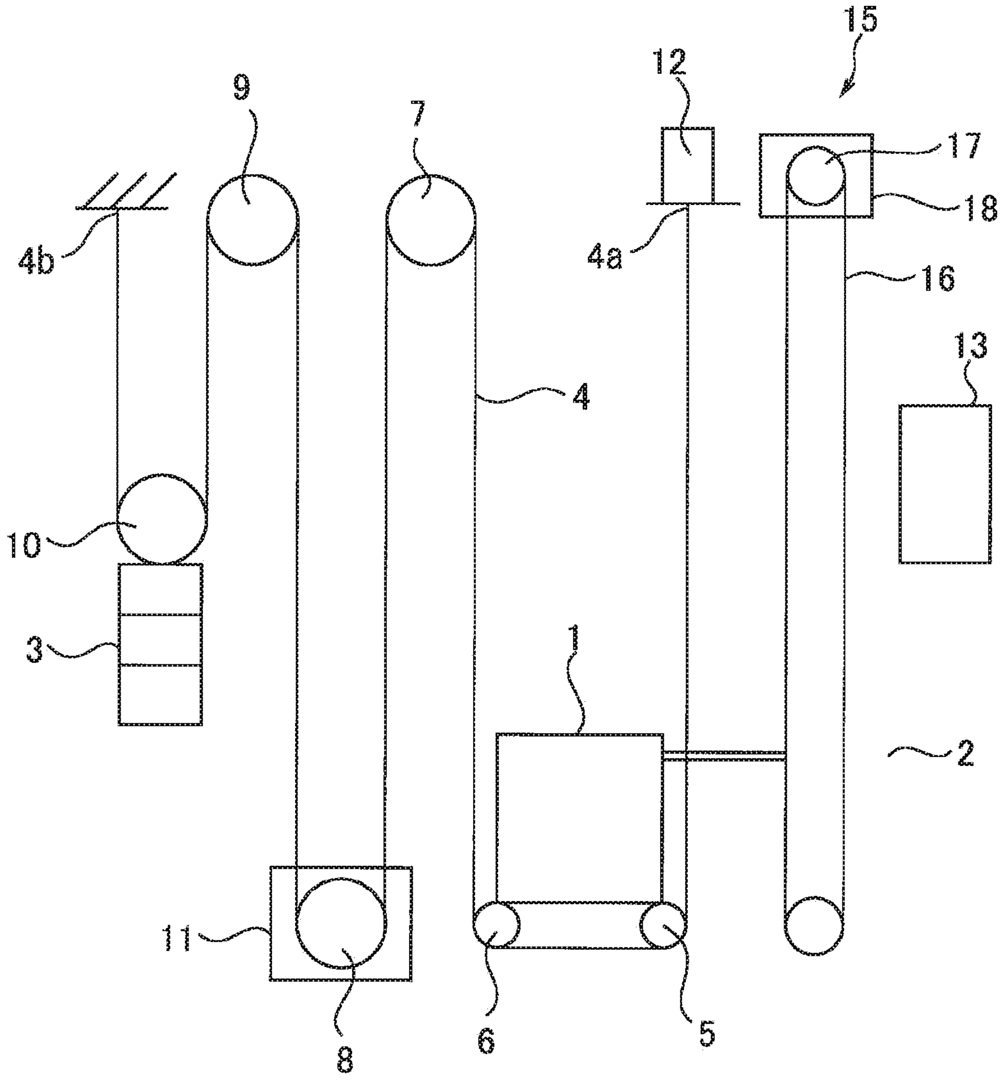
FIG. 1 is a view schematically showing an elevator apparatus.

The invention will be described with reference to the accompanying drawings. Redundant descriptions will be appropriately simplified or omitted. In the individual drawings, the same reference numerals denote the same or corresponding parts.

First Embodiment

FIG. 1 is a view schematically showing an elevator apparatus. A car 1 moves vertically in a shaft 2. For example, the shaft 2 is a vertically extending space formed in a building. A counterweight 3 moves vertically in the shaft 2. The car 1 and the counterweight 3 are suspended by a main rope 4 in the shaft 2. A roping method for suspending the car 1 and the counterweight 3 is not limited to an example shown in FIG. 1. The car 1 and the counterweight 3 may be suspended in the shaft 2 by 1:1 roping.

In the example shown in FIG. 1, one end portion 4*a* of the main rope 4 is supported by a fixing member provided in a top portion of the shaft 2. The main rope 4 extends downward from the end portion 4*a*. The main rope 4 is wound, from the end portion 4*a* side, around a suspension sheave 5, a suspension sheave 6, a return sheave 7, a driving sheave 8, a return sheave 9, and a suspension sheave 10. The main rope 4 extends upward from a portion thereof wound around the suspension sheave 10. The other end portion 4*b* of the main rope 4 is supported by a fixing member provided in the top portion of the shaft 2.

The suspension sheave 5 and the suspension sheave 6 are included in the car 1. The suspension sheave 5 and the suspension sheave 6 are provided to be rotative with respect to, for example, a member supporting a car floor. The return sheave 7 and the return sheave 9 are provided to be rotative with respect to, for example, a fixing member in the top portion of the shaft 2. The driving sheave 8 is included in a traction machine 11. The traction machine 11 is provided in a pit of the shaft 2. The suspension sheave 10 is included in the counterweight 3. The suspension sheave 10 is provided to be rotative with respect to, for example, a frame supporting an adjustment weight.

A layout of the sheaves around which the main rope 4 is wound is not limited to that in the example shown in FIG. 1. For example, the driving sheave 8 may be disposed in the top portion of the shaft 2. The driving sheave 8 may be disposed in a machine room (not shown) above the shaft 2.

A load weighing device 12 detects a load of the car 1. In the example shown in FIG. 1, the load weighing device 12 detects the load of the car 1 on the basis of a load applied to the end portion 4*a* of the main rope 4. The load weighing device 12 outputs a load signal corresponding to the detected load. The load signal output from the load weighing device 12 is input to a controller 13.

The traction machine 11 has a function of detecting a torque. The traction machine 11 outputs a torque signal corresponding to the detected torque. The torque signal output from the traction machine 11 is input to the controller 13.

The controller 13 controls the traction machine 11. The controller 13 arithmetically determines a command value for a rotation speed of the driving sheave 8. In the traction machine 11, the rotation speed of the driving sheave 8 is measured. An actually measured value of the rotation speed of the driving sheave 8 is input from the traction machine 11 to the controller 13. In the controller 13, a speed deviation signal corresponding to a difference between the command value for the rotation speed of the driving sheave 8 and the actually measured value is generated.

A governor 15 operates a safety gear (not shown) when a descending speed of the car 1 exceeds a reference speed. The safety gear is included in the car 1. When the safety gear is operated, the car 1 is forcibly stopped. The governor 15 includes, for example, a governor rope 16, a governor sheave 17, and an encoder 18. The governor rope 16 is coupled to the car 1. The governor rope 16 is wound around the governor sheave 17. When the car 1 moves, the governor rope 16 moves. When the governor rope 16 moves, the governor sheave 17 rotates. The encoder 18 outputs a rotation signal corresponding to a rotation direction and a rotation angle of the governor sheave 17. The rotation signal output from the encoder 18 is input to the controller 13. The encoder 18 is an example of a sensor configured to output a signal corresponding to a position of the car 1.

Figure 2:
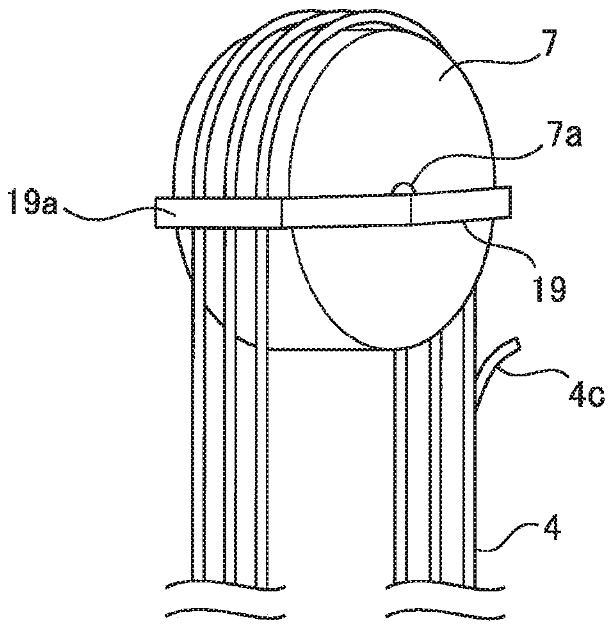
FIG. 2 is a perspective view showing a return sheave.
Figure 3:
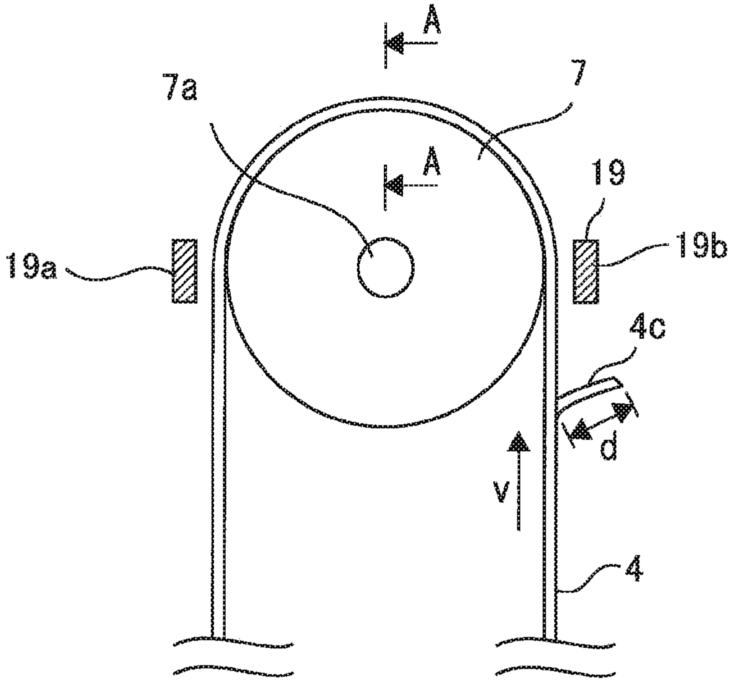
FIG. 3 is a view showing a cross section of the return sheave.

FIG. 2 is a perspective view showing the return sheave 7. FIG. 3 is a view showing a cross section of the return sheave 7. A rope guide 19 is provided on a member supporting the return sheave 7. In an example shown in FIGS. 2 and 3, the rope guide 19 is provided on a shaft 7*a* of the return sheave 7. The rope guide 19 prevents the main rope 4 from being detached from a groove of the return sheave 7. The rope guide 19 faces the main rope 4 with a given gap being provided therebetween.

The rope guide 19 includes, for example, a facing portion 19*a* and a facing portion 19*b*. The facing portion 19*a* faces a portion of the main rope 4 which draws apart from the groove of the return sheave 7. The facing portion 19*b* faces the other portion of the main rope 4 which draws apart from the groove of the return sheave 7. The return sheave 7 is used to change a direction in which the main rope 4 is moved by 180 degrees. Accordingly, the facing portion 19*a* and the facing portion 19*b* are disposed on both sides of the return sheave 7. Unless an abnormality occurs in the main rope 4, the main rope 4 does not come into contact with the rope guide 19.

FIGS. 2 and 3 show the example in which a broken portion 4*c* protrudes from a surface of the main rope 4. The main rope 4 is formed of a plurality of strands twisted together. Each of the strands is formed of a plurality of wires twisted together. The broken portion 4*c* is a portion with a wire break. The broken portion 4*c* may be a portion with a strand break. When the car 1 moves, the broken portion 4*c* passes through the return sheave 7. The broken portion 4*c* comes into contact with the rope guide 19 when passing through the return sheave 7.

FIGS. 2 and 3 show the return sheave 7 as an example of the sheaves around which the main rope 4 is wound. A rope guide may be provided on another sheave such as the suspension sheave 5. A rope guide may be provided on another sheave not shown in FIG. 1.

Figure 4:
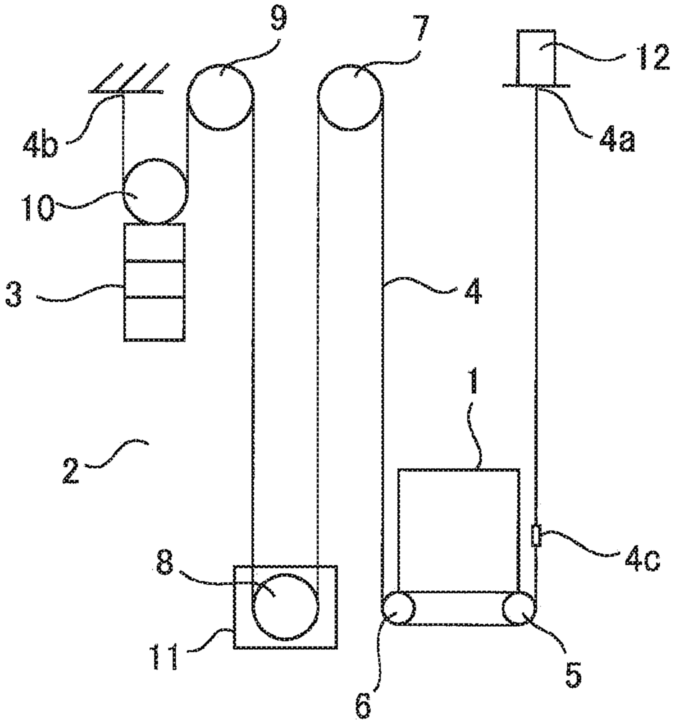
FIG. 4 is a view for illustrating movement of a broken portion of a main rope.
Figure 5:
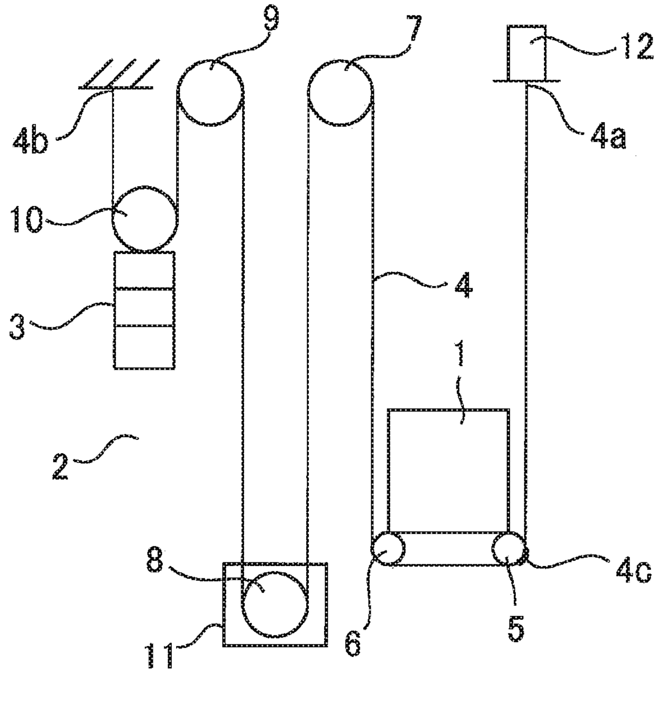
FIG. 5 is a view for illustrating movement of the broken portion of the main rope.
Figure 6:
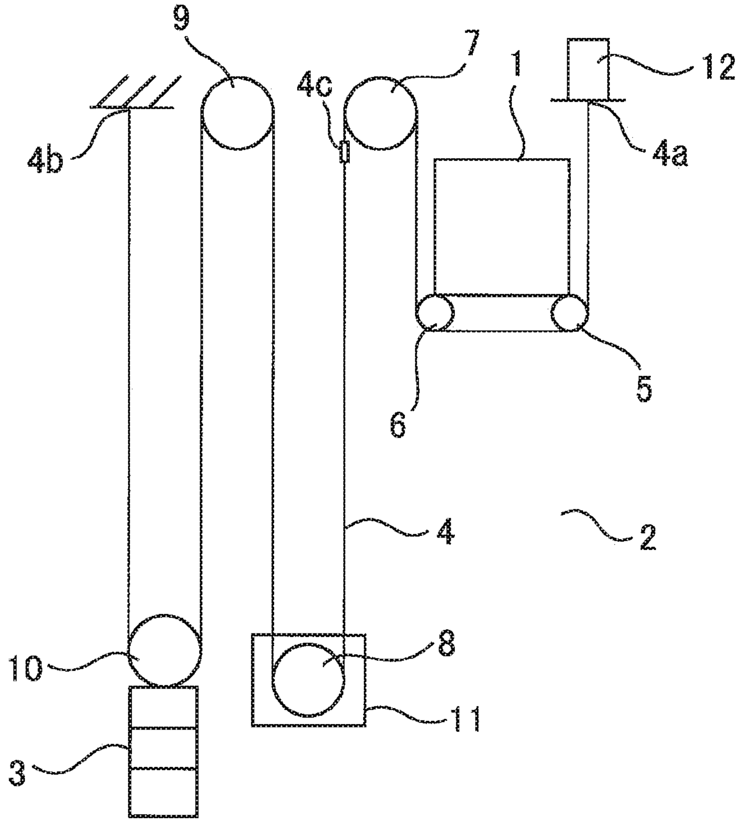
FIG. 6 is a view for illustrating movement of the broken portion of the main rope.
Figure 7A:
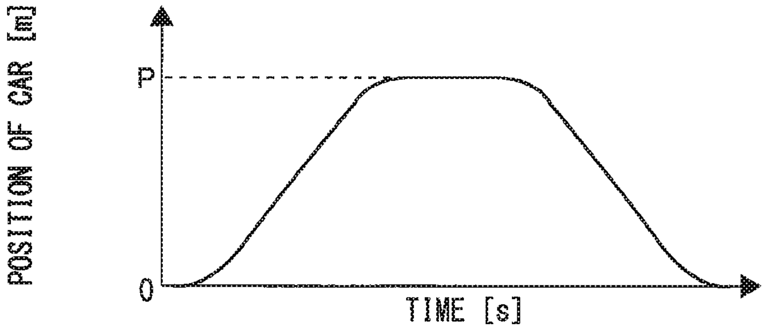
FIG. 7A is a view showing a position of a car.
Figure 7B:
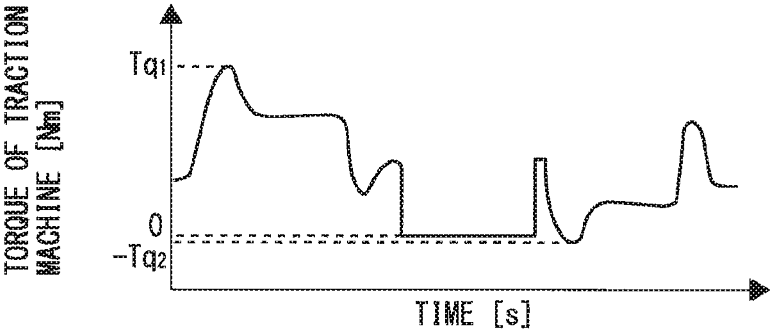
FIG. 7B is a view showing an examplesexample of an output signalssignal from a sensorssensor.
Figure 7C:
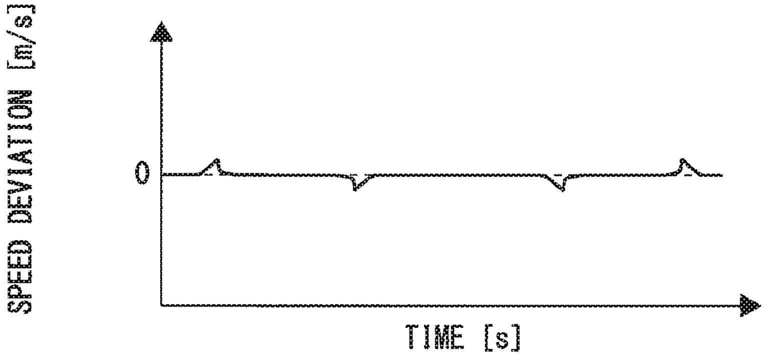
FIG. 7C is a view showing an example of an output signal from a sensor.
Figure 7D:
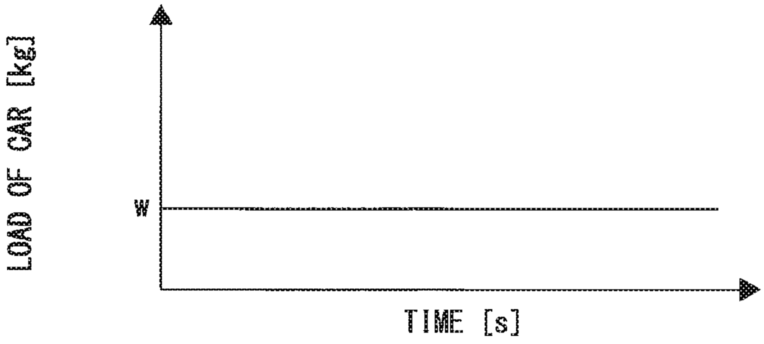
FIG. 7D is a view showing an example of an output signal from a sensor.
Figure 8A:
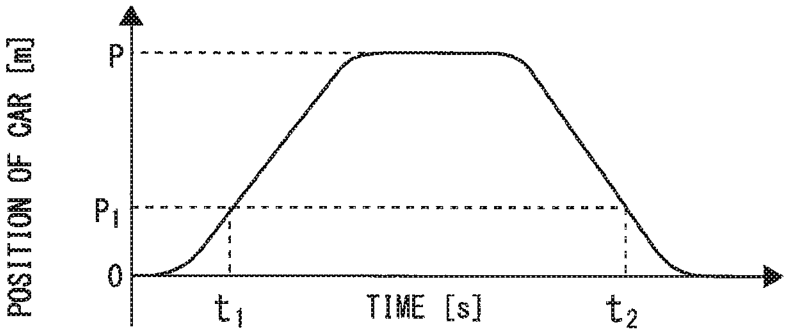
FIG. 8A is a view showing a position of the car.
Figure 8B:
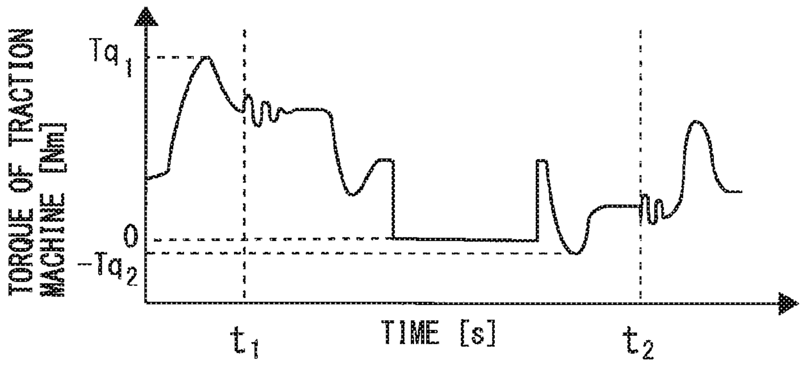
FIG. 8B is a view showing an example examples of the output signals from the sensorssensor.
Figure 8C:
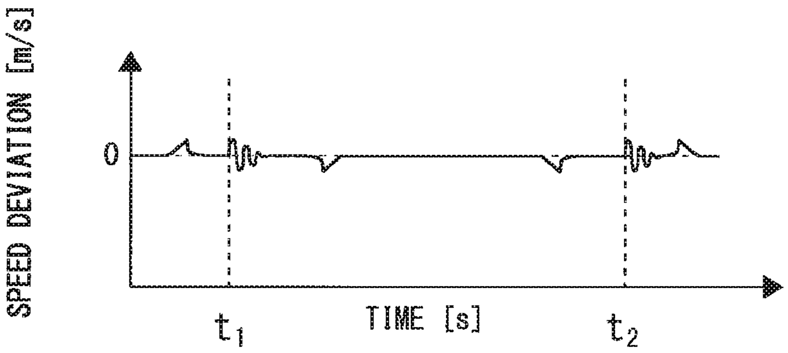
FIG. 8C is a view showing an example of the output signal from the sensor.
Figure 8D:
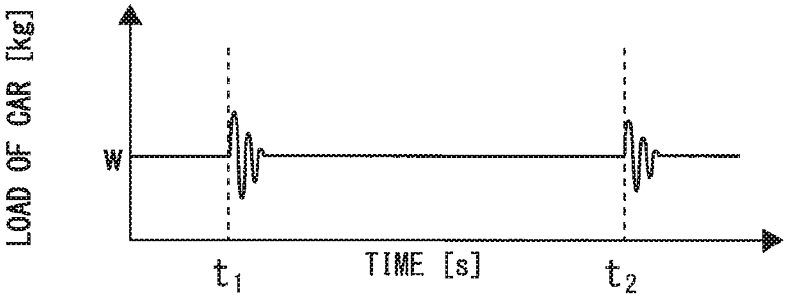
FIG. 8D is a view showing an example of the output signal from the sensor.

FIGS. 4 to 6 are views for illustrating movement of the broken portion 4*c* of the main rope 4. FIG. 4 shows a state where the car 1 is stopped at a hall on a lowermost floor. In the state where the car 1 is stopped at the hall on the lowermost floor, the broken portion 4*c* is present between the end portion 4*a* of the main rope 4 and a portion thereof wound around the suspension sheave 5.

FIG. 6 shows a state where the car 1 is stopped at a hall on an uppermost floor. In the state where the car 1 is stopped at the hall on the uppermost floor, the broken portion 4*c* is present between a portion of the main rope 4 wound around the return sheave 7 and a portion thereof wound around the driving sheave 8. In other words, when the car 1 moves from the hall on the lowermost floor to the hall on the uppermost floor, the broken portion 4*c* passes through the suspension sheave 5, the suspension sheave 6, and the return sheave 7. Even when the car 1 moves from the hall on the lowermost floor to the hall on the uppermost floor, the broken portion 4*c* does not pass through the driving sheave 8, the return sheave 9, and the suspension sheave 10. The broken portion 4*c* does not necessarily pass through all the sheaves. A combination of the sheaves through which the broken portion 4*c* passes is determined by a location at which the broken portion 4*c* appears and the like.

FIG. 5 shows a state where the car 1 has moved halfway from the hall on the lowermost floor to the hall on the uppermost floor. In the state shown in FIG. 5, a portion of the main rope 4 wound around the suspension sheave 5 has the broken portion 4*c*. The broken portion 4*c* comes into contact with the rope guide for the suspension sheave 5 when passing through the suspension sheave 5.

FIG. 7 is a view showing examples of output signals from sensors. In a description given below, a signal output from a sensor is referred to also as a sensor signal. FIG. 7(*a*) shows a position of the car 1. In an example shown in the present embodiment, the car 1 moves only vertically. Accordingly, a position of the car 1 is synonymous with a height at which the car 1 is present. FIG. 7(*a*) shows a change in car position when the car 1 moves from the lowermost floor to a position P and then returns to the lowermost floor. In FIG. 7(*a*), the car position on the lowermost floor is 0. A waveform shown in FIG. 7(*a*) is acquired on the basis of the rotation signal from the encoder 18.

FIG. 7(*b*) shows an example of a sensor signal FIG. 7(*b*) shows a torque of the traction machine 11. FIG. 7(*b*) shows a waveform of the torque signal output from the traction machine 11 when the car 1 moves between the lowermost floor and the position P. In FIG. 7(*b*), a maximum torque is $T_{q1}$, while a minimum torque is $-T_{q2}$.

FIG. 7(*c*) shows an example of a sensor signal. FIG. 7(*c*) shows a speed deviation of the rotation speed of the driving sheave 8. FIG. 7(*c*) shows a waveform of the speed deviation signal generated in the controller 13 when the car 1 moves between the lowermost floor and the position P.

FIG. 7(*d*) shows an example of a sensor signal FIG. 7(*d*) shows the load of the car 1. FIG. 7(*d*) shows a waveform of the load signal output from the load weighing device 12. FIG. 7(*d*) shows an example in which the load of the car 1 is w [kg].

FIGS. 7(*b*) to 7(*d*) show the waveforms of ideal sensor signals. However, in real sensor signals, variations are caused by various factors. The following will describe the variations caused in the sensor signals.

FIG. 8 is a view showing examples of the output signals from the sensors. FIG. 8(*a*) is a view corresponding to FIG. 7(*a*). FIG. 8(*b*) is a view corresponding to FIG. 7(*b*). FIG. 8(*c*) is a view corresponding to FIG. 7(*c*). FIG. 8(*d*) is a view corresponding to FIG. 7(*d*). FIG. 8 shows examples of waveforms obtained when the main rope 4 has the broken portion 4*c*.

The broken portion 4*c* passes through a given sheave when the car 1 passes through a position $P_1$. For example, the broken portion 4*c* passes through the return sheave 7 when the car 1 passes through the position $P_1$. The broken portion 4*c* comes into contact with the rope guide 19 when passing through the return sheave 7. As a result, when the car 1 passes through the position $P_1$, vibration occurs in the main rope 4. When the end portion 4*a* of the main rope 4 is displaced, the load signal output from the load weighing device 12 is affected thereby. That is, when the vibration occurred in the main rope 4 reaches the end portion 4*a*, a variation occurs in the load signal from the load weighing device 12.

Likewise, when a portion of the main rope 4 wound around the driving sheave 8 is displaced, rotation of the driving sheave 8 is affected thereby. Accordingly, when the vibration occurred in the main rope 4 reaches the portion of concern, a variation occurs in the speed deviation signal generated in the controller 13. Also, when the portion of the main rope 4 wound around the driving sheave 8 is displaced, the torque signal output from the traction machine 11 is affected thereby. Consequently, when the vibration occurred in the main rope 4 reaches the portion of concern, a variation occurs in the torque signal from the traction machine 11.

Thus, when the main rope 4 has the broken portion 4*c*, variations may occur in the sensor signals. The variations in the sensor signals resulting from the broken portion 4*c* repeatedly occur at the same car position. In addition, the broken portion 4*c* suddenly appears as a result of a wire break. Consequently, the variations in the sensor signals resulting from the broken portion 4*c* suddenly occur.

Figure 9:
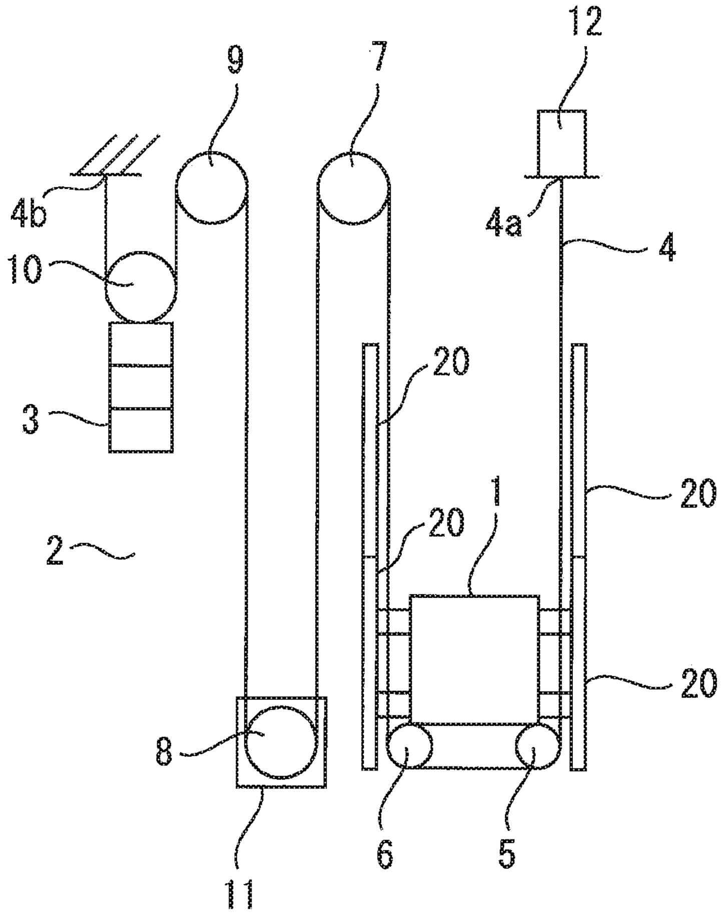
FIG. 9 is a view schematically showing the elevator apparatus.

FIG. 9 is a view schematically showing the elevator apparatus. In FIG. 9, illustration of the controller 13 and the governor 15 is omitted. The movement of the car 1 is guided by guide rails provided in the shaft 2. Each of the guide rails includes a large number of rail members 20 each having the same length. A large number of the rail members 20 are vertically connected to allow each of the guide rails to be disposed to cover a movement range of the car 1. Note that it is not necessary for all the rail members 20 included in the guide rails to have the same length. Each of the guide rails has joints between the rail members 20.

When oil supplied to the guide rails is depleted, the car 1 slightly swings when passing through a joint between the rail members 20. As described above, the main rope 4 is wound around the suspension sheave 5 and the suspension sheave 6. Accordingly, when the car 1 swings, vibration occurs in the main rope 4. When the oil supplied to the guide rails is depleted, variations occur in the sensor signals when the car 1 passes through the joint between the rail members 20. When the joint between the rail members 20 have level differences, larger variations occur in the sensor signals.

Figures 10A, 10B, 10C, 10D:
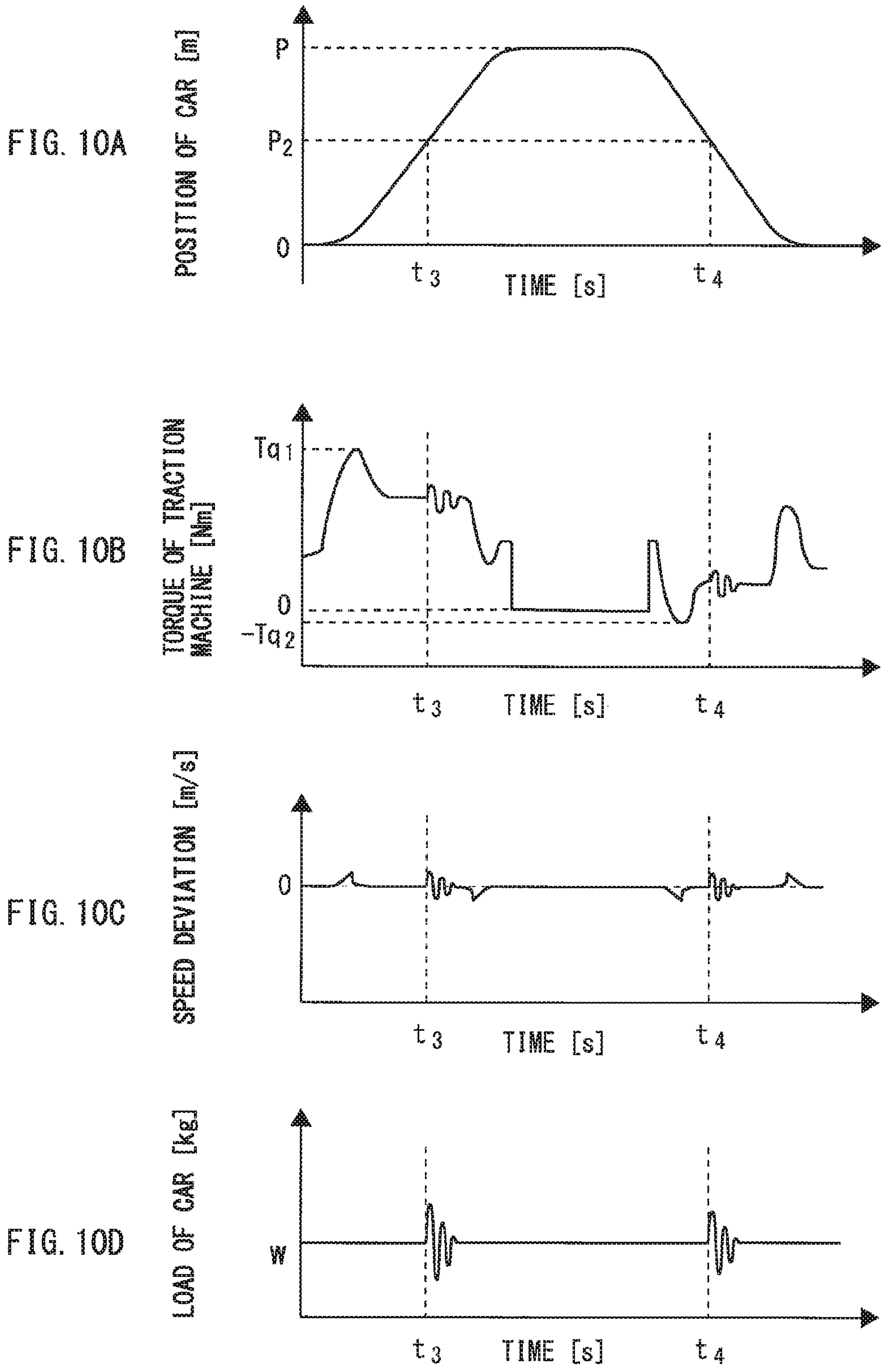
FIG. 10A is a view showing a position of the car.
FIG. 10B is a view showing an example of the output signal from the sensor.
FIG. 10C is a view showing an example of the output signal from the sensor.
FIG. 10D is a view showing an example of the output signal from the sensor.

FIG. 10 is a view showing examples of the output signals from the sensors. FIG. 10(*a*) is a view corresponding to FIG. 7(*a*). FIG. 10(*b*) is a view corresponding to FIG. 7(*b*). FIG. 10(*c*) is a view corresponding to FIG. 7(*c*). FIG. 10(*d*) is a view corresponding to FIG. 7(*d*). FIG. 10 shows examples of waveforms obtained when the oil supplied to the guide rails is depleted.

The car 1 passes through a given one of the joints between the rail members 20 at a position $P_2$. When the car 1 passes through this joint, the car 1 slightly swings. As a result, vibration occurs in the main rope 4 to cause a variation in the load signal from the load weighing device 12. Likewise, when the car 1 passes through the position $P_2$, a variation occurs in the speed deviation signal generated in the controller 13. When the car 1 passes through the position $P_2$, a variation occurs in the torque signal from the traction machine 11.

Thus, when an amount of the oil supplied to the guide rails is reduced, variations may occur in the sensor signals when the car 1 passes through any of the joints between the rail members 20. The variations in the sensor signals resulting from the joint between the rail members 20 repeatedly occur at the same car position. In addition, since the amount of the oil on a surface of each of the guide rails gradually decreases, the variations of the sensor signals resulting from the joint between the rail members 20 increase with a lapse of time.

Figure 11A:
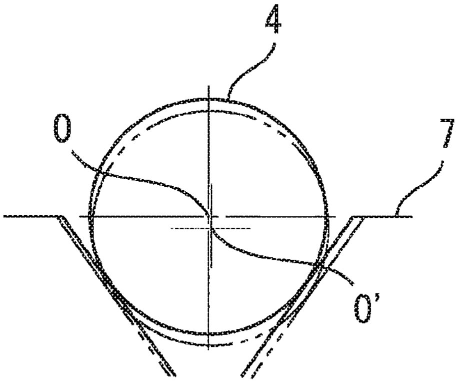
FIG. 11A is a view in which a cross section of the return sheave is enlarged.
Figure 11B:
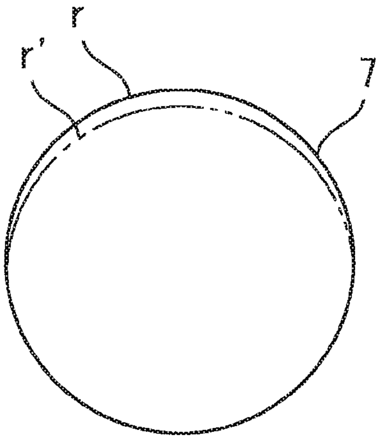
FIG. 11B is a view in which a cross section of the return sheave is enlarged.
Figure 12A:
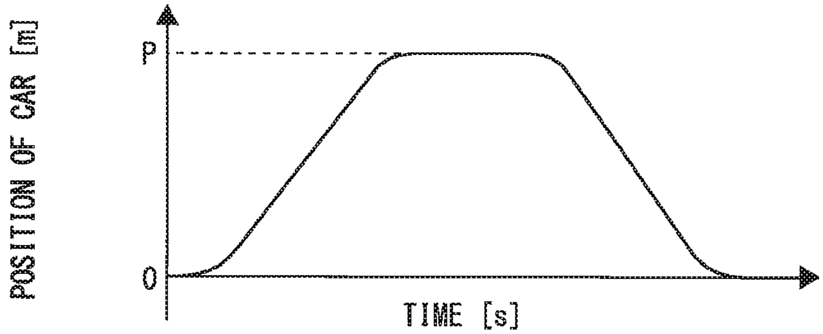
FIG. 12A is a view showing a position of the car.
Figure 12B:
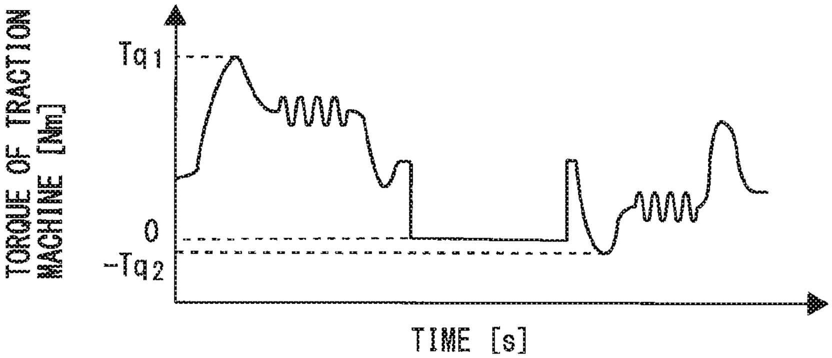
FIG. 12B is a view showing an example of the output signal from the sensor.
Figure 12C:
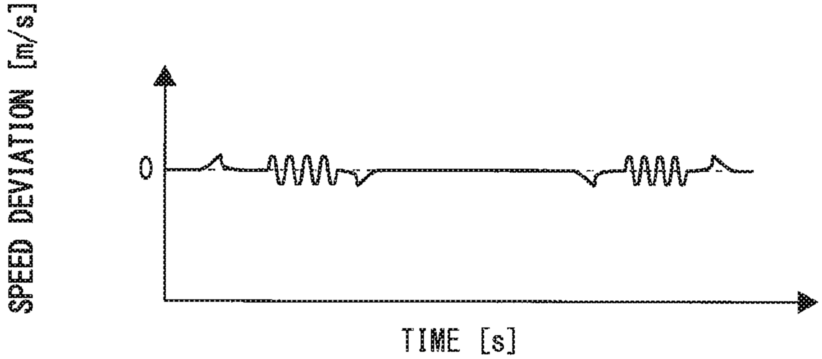
FIG. 12C is a view showing an example of the output signal from the sensor.
Figure 12D:
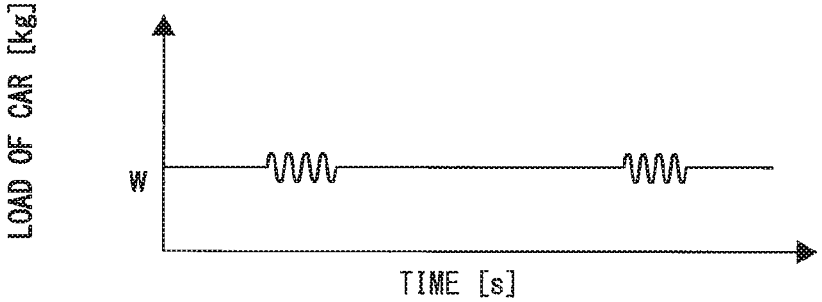
FIG. 12D is a view showing an example of the output signal from the sensor.

FIG. 11 is a view in which cross sections of the return sheave 7 are enlarged. FIG. 11(*a*) is a view corresponding to a cross section along a line A-A in FIG. 3. FIG. 11(*a*) shows an example in which a groove formed in the return sheave 7 is abraded. In FIG. 11(*a*), a center of the main rope 4 before the groove is abraded is denoted by a reference mark o, while the center of the main rope 4 when the groove is abraded is denoted by a reference mark o'. As shown in FIG. 11(*a*), when the groove formed in the return sheave 7 is abraded, a position through which the main rope 4 passes is shifted. A shift in the position through which the main rope 4 passes is caused also by displacement of the shaft 7*a* of the return sheave 7. FIG. 11(*b*) shows a cross section when the return sheave 7 is cut in a direction perpendicular to the shaft 7*a*. In FIG. 11(*b*), a shape of the return sheave 7 before the groove is abraded is denoted by a reference mark r, while the shape of the return sheave 7 after the groove is abraded is denoted by a reference mark r'. Before the groove is abraded, the return sheave 7 has a circular cross section. On the other hand, when the groove around which the main rope 4 is wound is unevenly abraded, the return sheave 7 no longer has the circular cross section, as shown in FIG. 11(*b*). Accordingly, when the groove is unevenly abraded, the return sheave 7 is rotated to shift the position through which the main rope 4 passes. When the groove is unevenly abraded, the position through which the main rope 4 passes varies depending on an angle of the rotation of the return sheave 7.

When the position through which the main rope 4 passes is shifted, vibration occurs in the main rope 4 every time the return sheave 7 rotates. Specifically, when the groove formed in the return sheave 7 is abraded, variations occur in the sensor signals when the car 1 moves. When the shaft 7*a* of the return sheave 7 is shifted, variations occur in the sensor signals when the car 1 moves.

FIG. 12 is a view showing examples of the output signals from the sensors. FIG. 12(*a*) is a view corresponding to FIG. 7(*a*). FIG. 12(*b*) is a view corresponding to FIG. 7(*b*). FIG. 12(*c*) is a view corresponding to FIG. 7(*c*). FIG. 12(*d*) is a view corresponding to FIG. 7(*d*). FIG. 12 shows examples of waveforms when the groove formed in the return sheave 7 is abraded.

When the groove formed in the return sheave 7 is abraded, the movement of the car 1 causes vibration in the main rope 4. This causes a variation in the load signal from the load weighing device 12. Likewise, when the car 1 moves, a variation occurs in the speed deviation signal generated in the controller 13. When the car 1 moves, a variation occurs in the torque signal from the traction machine 11.

When abnormality thus occurs in a sheave, the movement of the car 1 may cause variations in the sensor signals. Such variations in the sensor signals resulting from the abnormality in the sheave occur irrespective of the car position. FIG. 12 shows only variations observed in the sensor signals when the car 1 moves in a given section. Note that, when attention is focused only on a specific car position, the variations in the sensor signals resulting from the abnormality in the sheave repeatedly occur. In addition, since the abrasion of the groove gradually advances, the variations in the sensor signals resulting from the abnormality in the sheave increase with a lapse of time.

Factors causing variations in the sensor signals are not limited to the examples shown above. Since the main rope 4 is wound around the sheaves, there is friction between the main rope 4 and the sheaves. There is also friction between guide members included in the car 1 and the guide rails. As a result, mere movement of the car 1 causes variations resulting from such friction in the sensor signals. Note that, when attention is focused only on the specific car position, the variations in the sensor signals resulting from friction repeatedly occur. The variations in the sensor signals resulting from friction are similar to a DC component and do not increase with a lapse of time.

Figure 13:
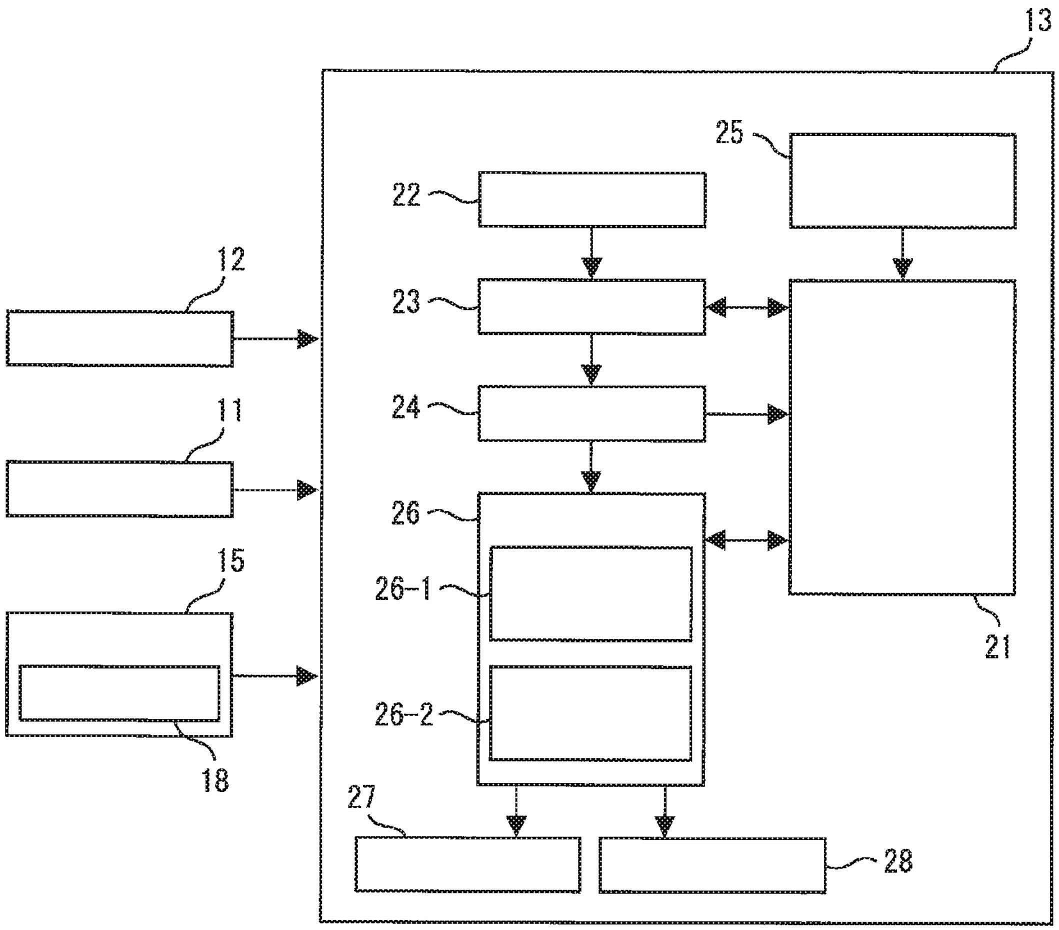
FIG. 13 is a view showing an example of a break detection device in a first embodiment.
Figure 14:
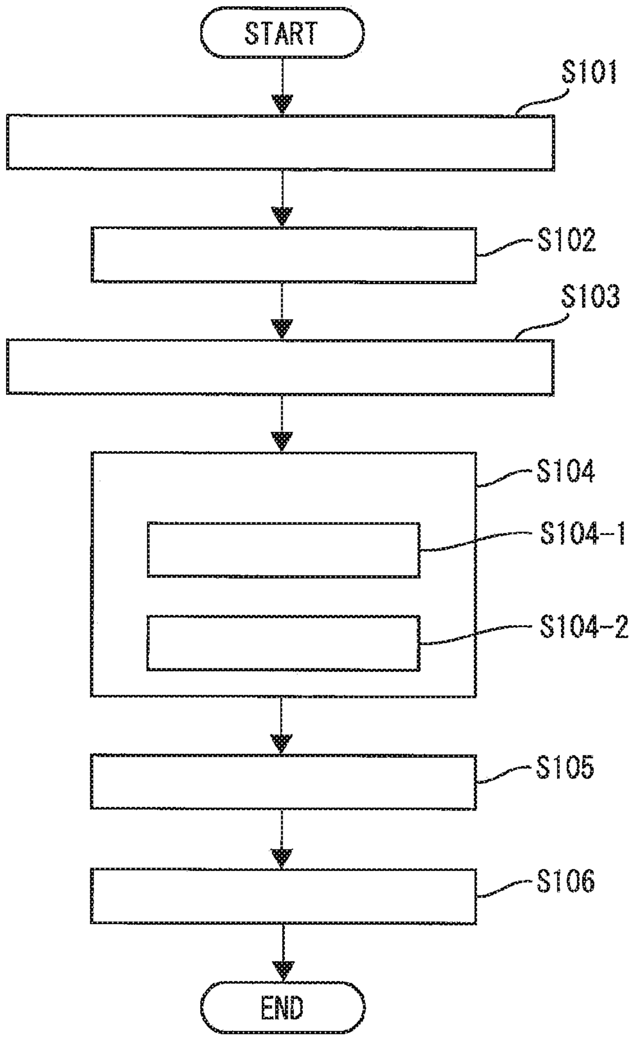
FIG. 14 is a flow chart showing an operation example of the break detection device in the first embodiment.

FIG. 13 is a view showing an example of a break detection device in a first embodiment. The controller 13 includes, for example, a storage unit 21, an extraction unit 22, an extraction unit 23, a detection unit 24, a car position detection unit 25, a determination unit 26, an operation control unit 27, and a notification unit 28. FIG. 13 shows an example in which the controller 13 has a function of detecting the broken portion 4*c* present in the main rope 4. It may be possible that a dedicated device for detecting the broken portion 4*c* is included in the elevator apparatus. Referring also to FIGS. 14 to 28, the following will specifically describe functions and operations of the break detection device. FIG. 14 is a flow chart showing an operation example of the break detection device in the first embodiment.

The extraction unit 22 extracts, from a sensor signal, a vibration component in a specific frequency band (S101). In the example shown in the present embodiment, each of the load signal, the speed deviation signal, and the torque signal can be used as the sensor signal. In another example, an acceleration signal from an acceleration meter (not shown) provided in the car 1 may be used as the sensor signal. The following will specifically describe an example in which the torque signal is used as the sensor signal. In Step S101, the extraction unit 22 extracts, from the torque signal, the vibration component in the specific frequency band.

For example, when the broken portion 4*c* shown in FIG. 3 comes into contact with the rope guide 19, an abnormal variation appears in the torque signal from the traction machine 11. The abnormal variation has a vibration component in a particular frequency band corresponding to a length of the broken portion 4*c* and to a moving speed of the main rope 4. When it is assumed that the length of the broken portion 4*c* is d [m] and the moving speed of the main rope 4 is v [m/s], a frequency f [Hz] of an abnormal vibration is given by the follow expression.

[Math. 1]

$$f=v/d \tag{1}$$

Figure 15:
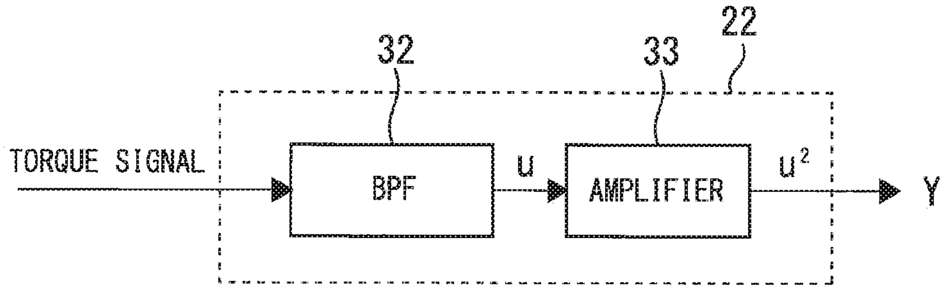
FIG. 15 is a view for illustrating an example of a function of a first extraction unit.

FIG. 15 is a view for illustrating an example of a function of a first extraction unit. In the example shown in the present embodiment, the first extraction unit is the extraction unit 22. The extraction unit 22 includes, for example, a band-pass filter 32. For a simpler description, in the drawings and the like, the band-pass filter is referred to also as BPF. The torque signal from the traction machine 11 is input to the band-pass filter 32. The band-pass filter 32 extracts, from the torque signal input thereto, the vibration component in the specific frequency band including the frequency f. The length d of the broken portion 4*c* is set in advance. For example, when the strand corresponding to 0.5 pitches to several pitches is raveled, a length of the raveled strand is set as the length d. The moving speed v is determined on the basis of the moving speed of the car 1. For example, the moving speed v of the main rope 4 can be calculated from a rated speed of the car 1.

As shown in FIG. 15, the extraction unit 22 may further include an amplifier 33. For example, the amplifier 33 squares a signal u. In the extraction unit 22, it may be possible to determine a square root of a signal $u^2$ output from the amplifier 33. In the extraction unit 22, it may be possible to obtain an absolute value of the signal u and add a positive sign to the signal. In the following description, a signal output from the extraction unit 22 is referred to as an output signal Y. When the extraction unit 22 includes the band-pass filter 32, the signal output from the extraction unit 22 is referred to also as the output signal Y from the band-pass filter 32.

FIG. 15 shows an example in which the extraction unit 22 includes the band-pass filter 32 to perform a filtering process on the torque signal input thereto. The extraction unit 22 may include a non-linear filter to extract the vibration component in the specific frequency band. It may be possible to apply an algorithm for an adoptive filter to the extraction unit 22 and extract the vibration component in the specific frequency band.

The extraction unit 23 extracts, from the vibration component extracted by the extraction unit 22, a determination signal (S102). The determination signal is a signal necessary for determining occurrence of a sudden variation in the sensor signal. The extraction unit 23 attenuates a trend component from the vibration component extracted by the extraction unit 22 to obtain the determination signal. For example, the trend component is a component indicative of a long-term changing tendency of the vibration in about most recent thousand travels of the car 1. The trend component includes, for example, a steady vibration component and a progressively-increasing vibration component.

Figure 16:
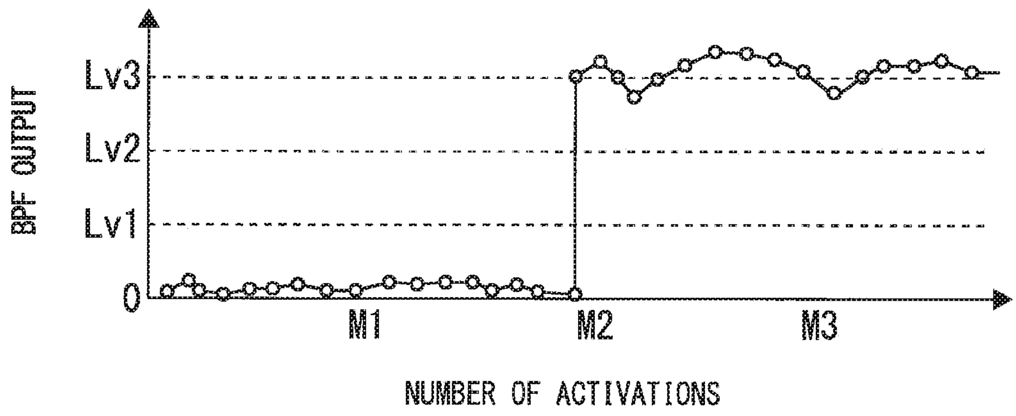
FIG. 16 is a view showing a transition of a variation occurred in a sensor signal.
Figure 17:
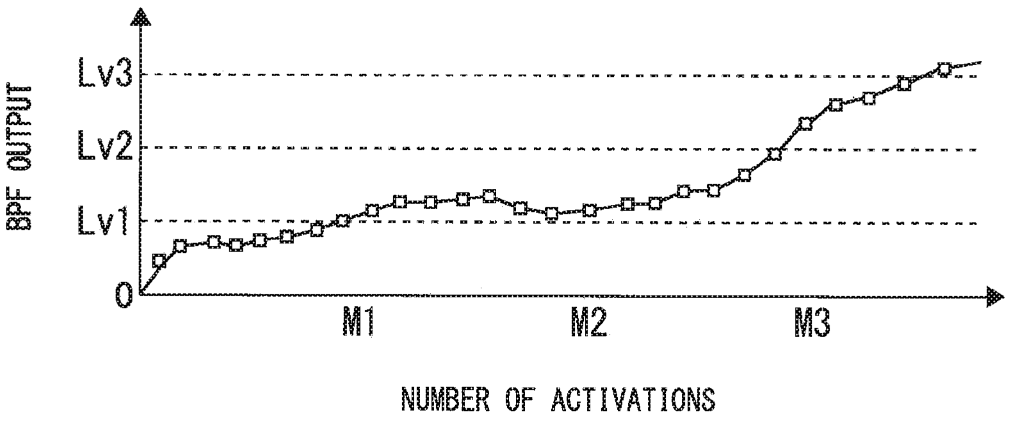
FIG. 17 is a view showing a transition of a variation occurred in a sensor signal.
Figure 18:
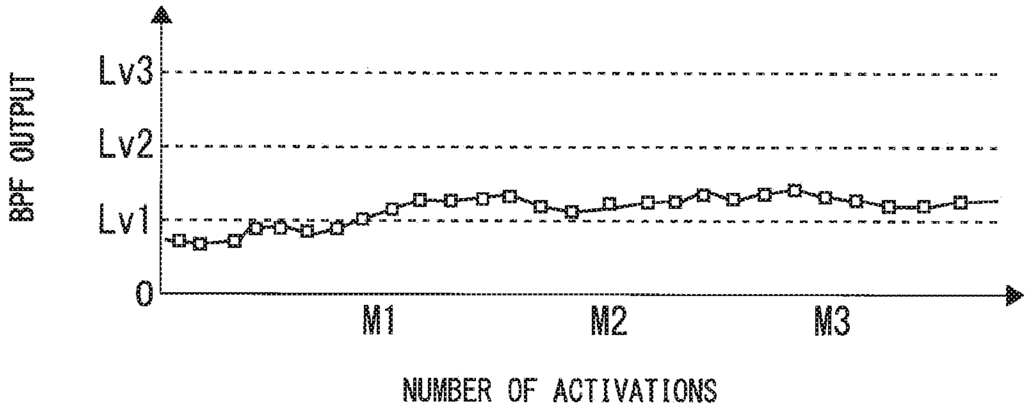
FIG. 18 is a view showing a transition of a variation occurred in a sensor signal.

FIGS. 16 to 18 are views each showing a transition of the variation occurred in the sensor signal. In each of the FIGS. 16 to 18, an ordinate axis represents a value corresponding to an amplitude of the variation occurred in the sensor signal, while an abscissa axis represents the number of activations of the elevator. The abscissa axis may represent time elapsed from installation of the elevator. The abscissa axis may represent the number of times the car 1 passes through the position $P_1$.

FIG. 16 shows a value of the output signal Y obtained when the car 1 passes through the position $P_1$. At the time when the number of activations is M1, the broken portion 4*c* does not appear in the main rope 4. FIG. 16 shows an example in which the broken portion 4*c* appears in the main rope 4 when the number of activations is M2. As described above, the broken portion 4*c* suddenly appears as a result of a wire break. Consequently, a variation in the sensor signal resulting from the broken portion 4*c* suddenly occurs. When the broken portion 4*c* appears in the main rope 4, the value of the output signal Y suddenly increases as compared to a value thereof immediately before.

Figures 19A, 19B, 19C:
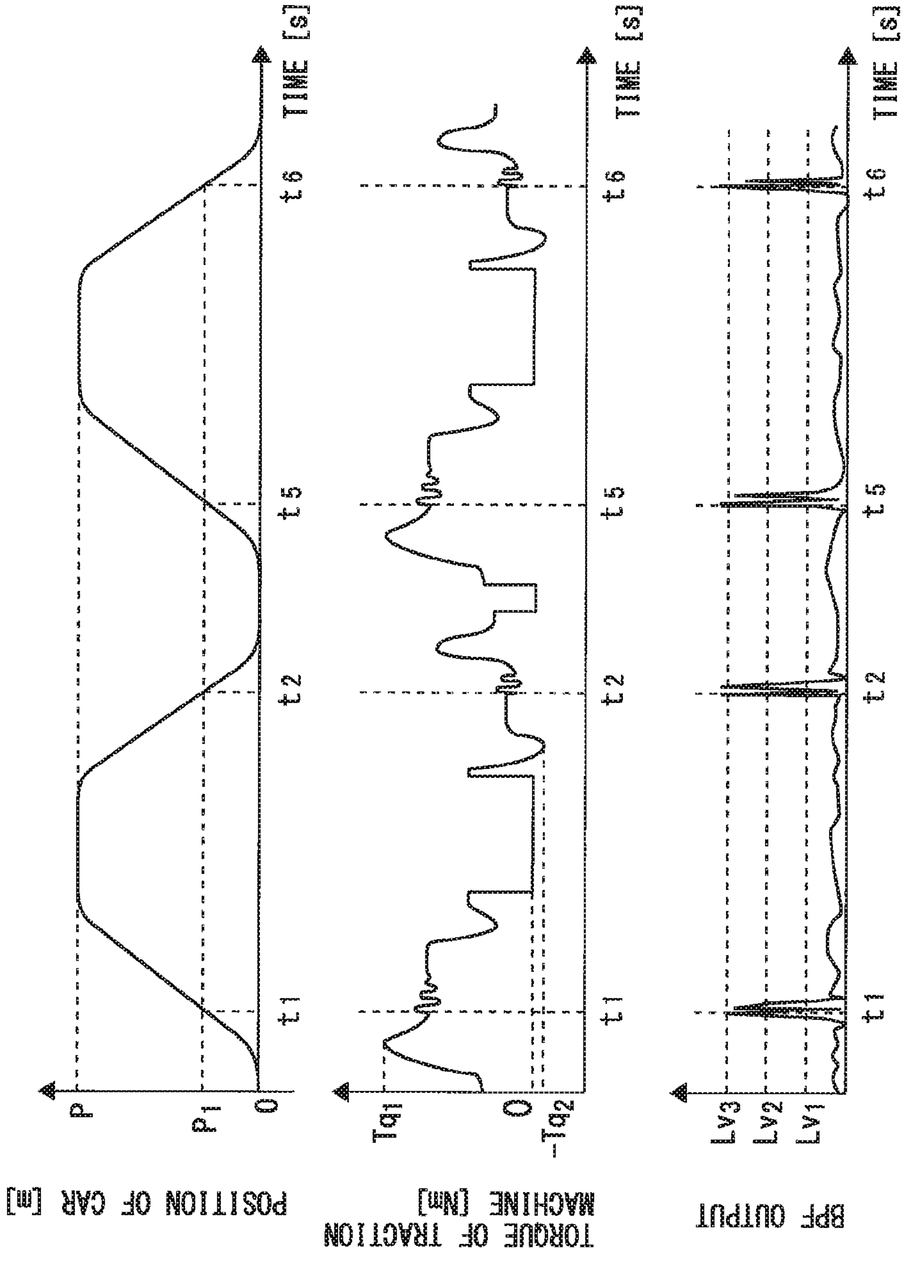
FIG. 19A is a view showing a position of the car.
FIG. 19B is a view for illustrating a transition of the variation occurred in the sensor signal.
FIG. 19C is a view for illustrating the transition of the variation occurred in the sensor signal.

FIG. 19 is a view for illustrating a transition of the variation occurred in the sensor signal. FIG. 19 shows the transition when, after the broken portion 4*c* appears in the main rope 4, the car 1 makes two round trips between the uppermost floor and the position P. In the example shown in FIG. 19, the car 1 passes through the position $P_1$ at a time $t_1$, at a time $t_2$, at a time $t_5$, and at a time $t_6$. FIG. 19(*b*) shows the torque of the traction machine 11. FIG. 19(*c*) shows the value of the output signal Y. When the broken portion 4*c* appears in the main rope 4, every time the car 1 passes through the position $P_1$, the broken portion 4*c* comes into contact with the rope guide 19. As a result, when the broken portion 4*c* appears in the main rope 4, the output signal Y at the position $P_1$ continues to show a large value thereafter.

FIG. 17 shows the value of the output signal Y obtained when the car 1 passes through the position $P_2$. As described above, the amount of the oil applied to the guide rails does not suddenly change. The amount of the oil applied to the guide rails gradually decreases to be finally depleted unless oil is supplied. Accordingly, as shown in FIG. 17, a variation in the sensor signal resulting from a joint between the rail members 20 gradually increases with time. Note that, as shown in FIG. 17, a variation in the sensor signal resulting from the abnormality in the sheave gradually increases with time, similarly to the variation in the sensor signal resulting from the joint between the rail members 20.

FIG. 17 shows an example of the output signal Y having the progressively increasing vibration component. Among the vibration components extracted by the extraction unit 22, the progressively increasing vibration component is the vibration component gradually growing with time. For example, the progressively increasing vibration component is the vibration component which varies, on the basis of the variation in the sensor signal after oil is supplied to the guide rails, at a rate such that, when the car 1 passes through the joint between the rail members 20 thousand times, the traction machine torque signal varies by 1 [N/m]. The extraction unit 23 attenuates a vibration component as shown in FIG. 17.

FIG. 18 shows the value of the output signal Y obtained when the car 1 passes through a given position. As shown in FIG. 18, the variation in the sensor signal resulting from friction constantly shows the same value. FIG. 18 shows an example of the output signal Y having the steady vibration component. Among the vibration components extracted by the extraction unit 22, the steady vibration component is the vibration component which is steadily generated, similarly to a DC component. The steady vibration component may also include a vibration component which more slowly varies than the progressively increasing vibration component. For example, a vibration component which requires the elevator to be activated (pass through the joint) 1000 or more times to allow the traction machine torque signal to vary by 1 [N/m] may also be included in the steady vibration component. The extraction unit 23 attenuates a vibration component as shown in FIG. 18.

Figure 20:
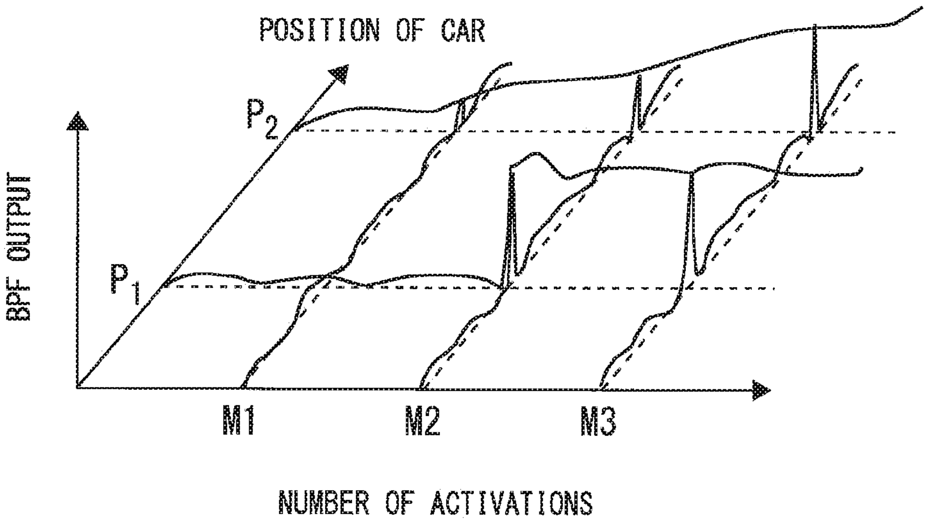
FIG. 20 is a view three-dimensionally showing a transition of the variation occurred in the sensor signal.

FIG. 20 is a view three-dimensionally showing a transition of the variation occurred in the sensor signal. FIG. 20 corresponds to a view showing the signal shown in FIG. 16 and the signal shown in FIG. 17 in combination.

Figure 21:
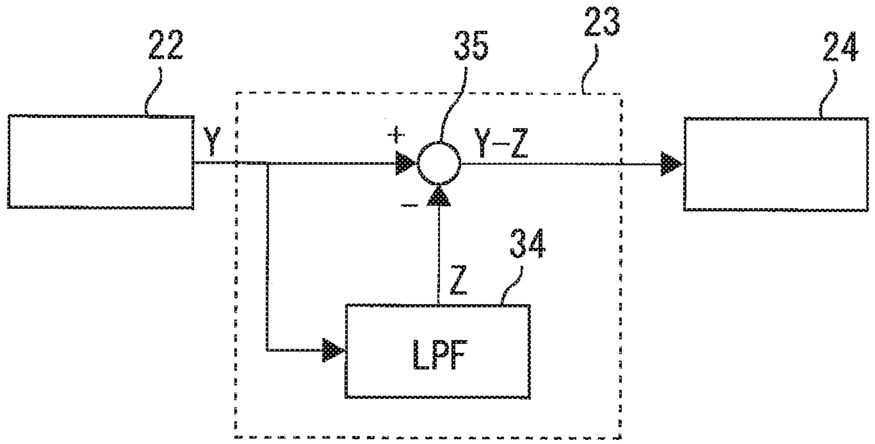
FIG. 21 is a view for illustrating an example of a function of a second extraction unit.

FIG. 21 is a view for illustrating an example of a function of a second extraction unit. In the example shown in the present embodiment, the second extraction unit is the extraction unit 23. The extraction unit 23 includes, for example, a low-pass filter 34 and a subtractor 35. For a simpler description, in the drawings and the like, the low-pass filter is referred to also as LPF. The output signal Y from the band-pass filter 32 is input to the low-pass filter 34. The output signal Y from the band-pass filter 32 and an output signal Z from the low-pass filter 34 are input to the subtractor 35. The subtractor 35 outputs, as the determination signal, a differential signal Y-Z between the output signal Y from the band-pass filter 32 and the output signal Z from the low-pass filter 34. The output signal Y-Z from the subtractor 35 is input to the detection unit 24.

Figures 22A, 22B, 22C:
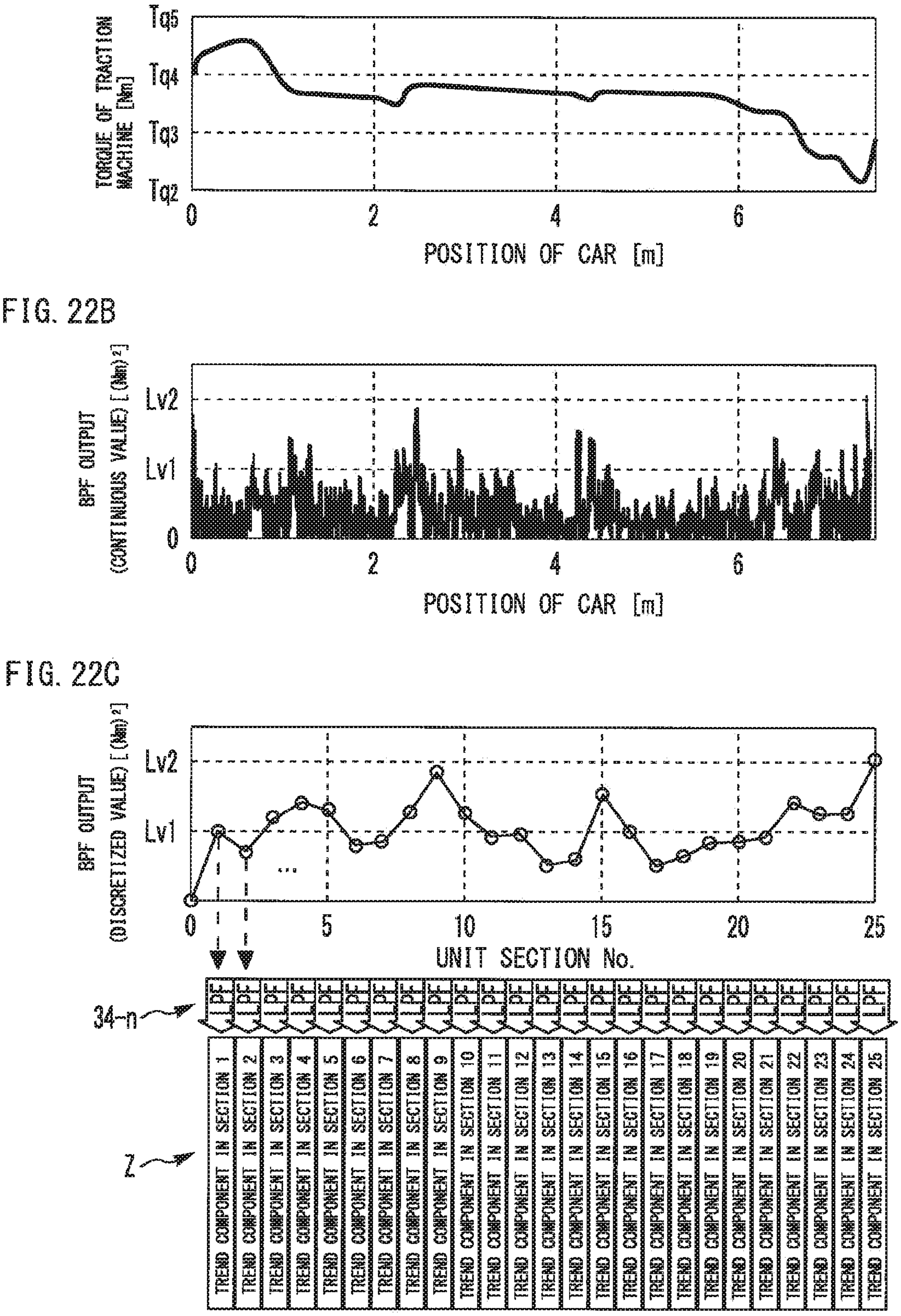
FIG. 22A is a view for illustrating an example of performing the first extraction unit and the second extraction unit.
FIG. 22B is a view for illustrating the example of performing the first extraction unit and the second extraction unit.
FIG. 22C is a view for illustrating the example of performing the first extraction unit and the second extraction unit.

FIG. 22 is a view for illustrating an example of performing the first extraction unit and the second extraction unit. FIG. 22(*a*) shows the torque of the traction machine 11. The torque signal shown in FIG. 22(*a*) is input to the band-pass filter 32. FIG. 22(*b*) shows the output signal $u^2$ from the amplifier 33. The output signal $u^2$ from the amplifier 33 is a continuous signal. The extraction unit 22 discretizes the continuous output signal $u^2$. In the example shown in FIG. 22, the extraction unit 22 outputs the discretized signal as the output signal Y from the band-pass filter 32.

For example, a section in which the car 1 moves is imaginarily divided into a plurality of vertically consecutive unit sections. FIG. 22 shows an example in which the unit sections are set at each given height. For example, the section in which the car position ranges from 0 m to 0.3 m is set as a first unit section. The section in which the car position ranges from 0.3 m to 0.6 m is set as a second unit section. The second unit section is the section immediately above the first unit section. The section in which the car position ranges from 0.6 m to 0.9 m is set as a third unit section. The third unit section is the section immediately above the second unit section. The sections above the third unit section are similarly set. For a simpler description, in the drawings and the like, an n-th unit section is referred to also as a section n.

The extraction unit 22 extracts one signal for each of the unit sections to discretize the continuous output signal $u^2$. For example, the extraction unit 22 extracts the signal $u^2$ having a maximum value in one of the unit sections as the output signal Y in the unit section.

The extraction unit 23 includes the low-pass filters 34 corresponding to the individual unit sections. For example, the low-pass filter 34 corresponding to the first unit section is referred to as a filter 34-1. The low-pass filter 34 corresponding to the second unit section is referred to as a filter 34-2. The low-pass filter 34 corresponding to the third unit section is referred to as a filter 34-3. Likewise, the low-pass filter 34 corresponding to the n-th unit section is referred to as a filter 34-*n*.

The output signal Y from the band-pass filter 32 when the car 1 moves in the first unit section is input to the filter 34-1. The output signal Z from the filter 34-1 corresponds to the trend component in the first unit section. The output signal Z from the filter 34-1 is input to the subtractor 35. The output signal Y from the band-pass filter 32 when the car 1 moves in the second unit section is input to the filter 34-2. The output signal Z from the filter 34-2 corresponds to the trend component in the second unit section. The output signal Z from the filter 34-2 is input to the subtractor 35.

The output signal Y from the band-pass filter 32 when the car 1 moves in the third unit section is input to the filter 34-3. The output signal Z from the filter 34-3 corresponds to the trend component in the third unit section. The output signal Z from the filter 34-3 is input to the subtractor 35. Likewise, the output signal Y from the band-pass filter 32 when the car 1 moves in the n-th unit section is input to the filter 34-*n*. The output signal Z from the filter 34-*n* corresponds to the trend component in the n-th unit section. The output signal Z from the filter 34-*n* is input to the subtractor 35.

The subtractor 35 outputs, as the determination signal in the first unit section, a differential signal between the output signal Y from the band-pass filter 32 and the output signal Z from the filter 34-1 when the car 1 moves in the first unit section. The subtractor 35 outputs, as the determination signal in the second unit section, a differential signal between the output signal Y from the band-pass filter 32 and the output signal Z from the filter 34-2 when the car 1 moves in the second unit section. The subtractor 35 outputs, as the determination signal in the third unit section, a differential signal between the output signal Y from the band-pass filter 32 and the output signal Z from the filter 34-3 when the car 1 moves in the third unit section. Likewise, the subtractor 35 outputs, as the determination signal in the n-th unit section, a differential signal between the output signal Y from the band-pass filter 32 and the output signal Z from the filter 34-*n* when the car 1 moves in the n-th unit section.

FIGS. 21 and 22 show an example in which a low-pass filtering process is performed on the output signal Y from the band-pass filter 32 to obtain the trend component of the output signal Y. To implement such a function, it is necessary to set a time constant of each of the low-pass filters 34 to a rather large value.

For example, it is assumed that $TF_1$ represents the number of travels of the car 1 which is required by a value of the variation in the sensor signal resulting from the joint between the rail members 20 to vary from a given normal value to an abnormal value when oil is not supplied to the guide rails. For example, the normal value is a value of the variation in the sensor signal obtained by moving the car 1 in a state where the oil is sufficiently applied to the guide rails immediately after the installation of the elevator. The abnormal value is a value of the variation in the sensor signal set in advance as an abnormal value. Furthermore, it is assumed that $TF_2$ represents the number of travels of the car 1 which is required by the value of the variation in the sensor signal to return from the abnormal value to the normal value as a result of a supply of the oil to the guide rails.

The number of travels $TF_2$ is smaller than the number of travels $TF_1$. The time constant of each of the low-pass filters 34 is preferably set on the basis of the number of travels $TF_2$. By way of example, the time constant is set such that, as a result of causing the car 1 to pass through a given joint between the rail members 20 1000±200 times, the output of the low-pass filter 34 follows a constant input value.

In another example, the time constant of each of the low-pass filters 34 may be changed on the basis of the number of travels of the car 1. For example, during a period after the oil is supplied to the guide rails and before the number of travels of the car 1 reaches a reference number, the time constant of each of the low-pass filters 34 is set to a first set value based on the number of travels $TF_2$. When the number of travels of the car 1 after the oil supply reaches the reference number, the time constant of each of the low-pass filters 34 is changed from the first set value to a second set value. The second set value is larger than the first set value. The second set value is set, for example, on the basis of the number of travels $TF_1$. As a result, the trend component corresponding to the state of the oil can be obtained.

Figure 23:
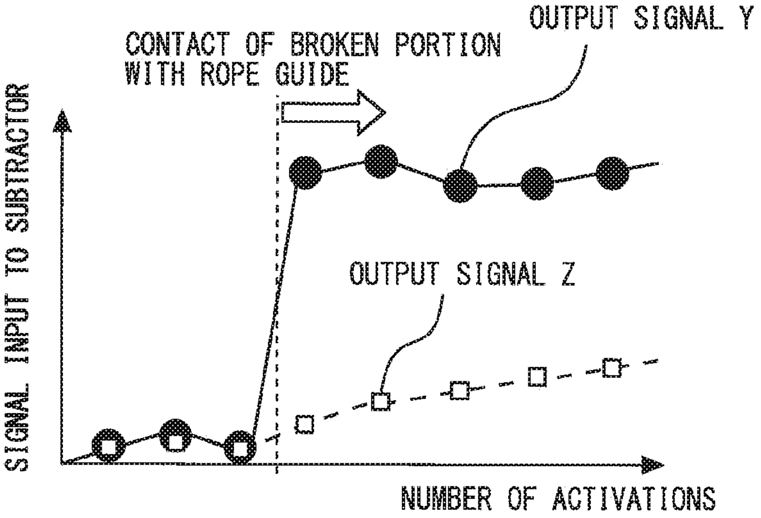
FIG. 23 is a view showing an example of a signal input to a subtractor.
Figure 24:
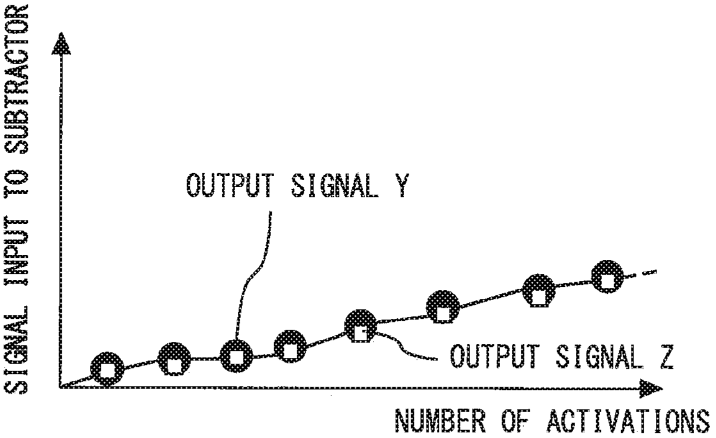
FIG. 24 is a view showing an example of a signal input to the subtractor.
Figure 25:
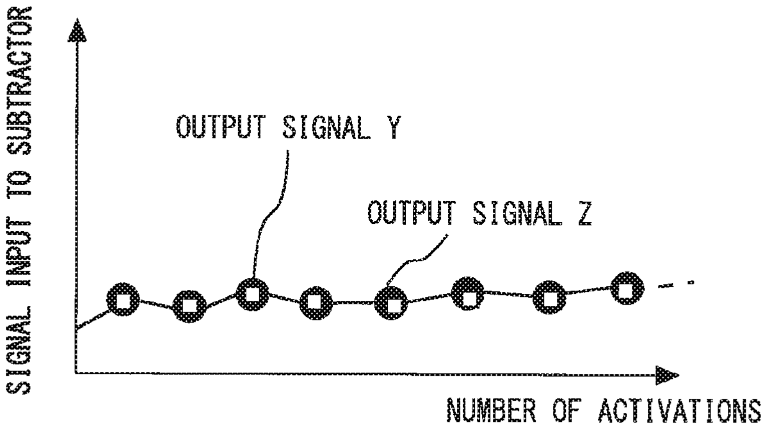
FIG. 25 is a view showing an example of a signal input to the subtractor.

FIGS. 23 to 25 are views showing an example of the signals input to the subtractor 35. In FIGS. 23 to 25, each of solid circles indicates the output signal Y from the band-pass filter 32, while each of blank squares indicates the output signal Z from the low-pass filter 34. FIG. 23 shows an example in which the output signal Y shown in FIG. 16 is input to the subtractor 35. As described above, when the broken portion 4*c* appears in the main rope 4, the output signal Y rapidly increases. On the other hand, the output signal Z from the low-pass filter 34 does not follow the sudden change of the output signal Y. Therefore, a difference between the output signal Y and the output signal Z suddenly increases as a result of appearance of the broken portion 4*c* in the main rope 4. After the broken portion 4*c* appears, the difference between the output signal Y and the output signal Z gradually decreases.

FIG. 24 shows an example in which the output signal Y shown in FIG. 17 is input to the subtractor 35. As described above, when the amount of the oil on the surfaces of the guide rails decreases, the value of the output signal Y gradually increases. When a slow change as shown in FIG. 17 appears in the output signal Y, the output signal Z follows the change of the output signal Y. Accordingly, in the example shown in FIG. 24, the output signal Y and the output signal Z have similar values.

FIG. 25 shows an example in which the output signal Y shown in FIG. 18 is input to the subtractor 35. When a slow change as shown in FIG. 18 appears in the output signal Y, the output signal Z follows the change of the output signal Y. Accordingly, in the example shown in FIG. 25 also, the output signal Y and the output signal Z have similar values.

Note that, to prevent erroneous detection, as an initial value of the low-pass filter 34, a value other than 0 is preferably set. In a case where 0 is output as an initial value of the output signal Z from the low-pass filter 34, when a large value is output as an initial value of the output signal Y due to, for example, passage of the car 1 through a joint between the rail members 20, a value of the determination signal Y-Z suddenly increases to cause erroneous detection. At this time, the determination signal Y-Z presents a difference between the initial value of the output signal Y and the initial value of the output signal Z. When a value other than 0 is set as the initial value of the output signal Z, even when a large value is output as the initial value of the output signal Y, the value of the determination signal Y-Z does not suddenly increase. As a result, it is possible to prevent erroneous detection. As the initial value of the low-pass filter 34, for example, a value obtained by multiplying a value of a first threshold described later by a factor of not less than 1 is preferably set.

FIG. 21 and FIG. 22 show an example in which the extraction unit 23 includes the low-pass filter 34. The extraction unit 23 may extract the determination signal without including the low-pass filter 34. For example, the extraction unit 23 may arithmetically determine the trend component of the vibration on the basis of a moving average value of the output signal Y from the band-pass filter 32. For example, the extraction unit 23 arithmetically determines the moving average value from the most recently produced twenty output signals Y. In another example, the extraction unit 23 may arithmetically determine the trend component of the vibration using a machine learning algorithm such as a neural network. That is, the extraction unit 23 may have a leaning function. The foregoing is only exemplary. For example, the extraction unit 23 may arithmetically determine the moving average value from any number of the most recently produced output signals Y. Any number mentioned above is, for example, any number from ten to one hundred.

Figure 26:
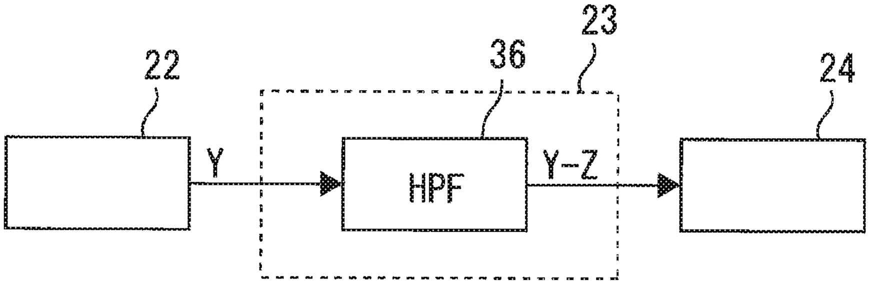
FIG. 26 is a view showing another example which performs a function of the second extraction unit.

FIG. 26 is a view showing another example which performs the function of the second extraction unit. The extraction unit 23 includes, for example, a high-pass filter 36. For a simpler description, in the drawings and the like, the high-pass filter is referred to also as HPF. When the low-pass filter 34 shown in FIG. 21 is designed using a first-order-lag transfer function, the output signal Y-Z from the subtractor 35 is given by Expression 2 shown below.

[Math. 2]

$$Y - Z = Y - \frac{1}{s\tau + 1}Y = \frac{s\tau}{s\tau + 1}Y \qquad (2)$$

In Expression 2, s represents a Laplace operator, while r represents a time constant. The transfer function in Expression 2 is a transfer function of a first-order high-pass filter. That is, in the example shown in FIG. 26 also, the extraction unit 23 can perform the same function as that performed in the example shown in FIG. 21. In the example shown in FIG. 26, the output signal Y from the band-pass filter 32 is input to the high-pass filter 36. The high-pass filter 36 outputs, as the determination signal, a signal corresponding to the output signal Y-Z from the subtractor 35.

Figure 27A:
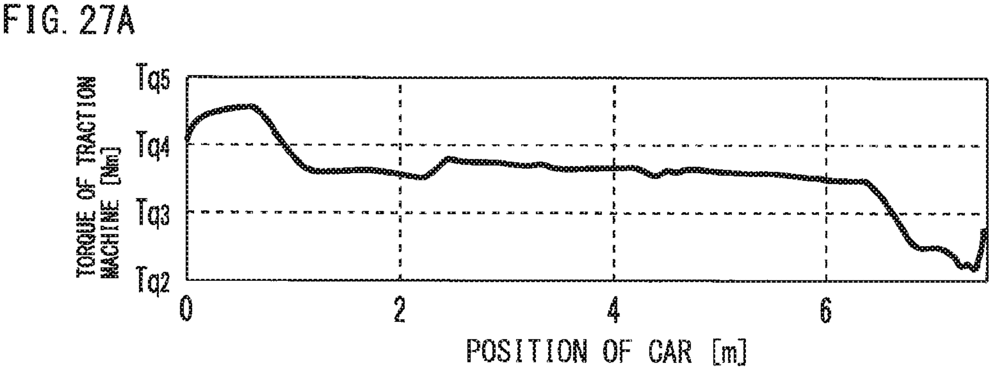
FIG. 27A is a view for illustrating another example of performing the first extraction unit and the second extraction unit.
Figure 27B:
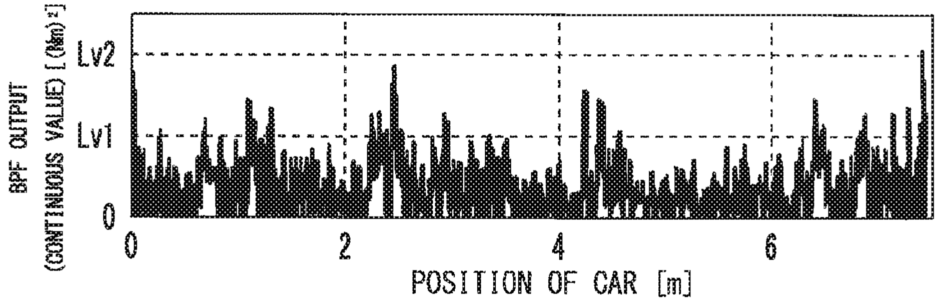
FIG. 27B is a view for illustrating the example of performing the first extraction unit and the second extraction unit.
Figure 27C:
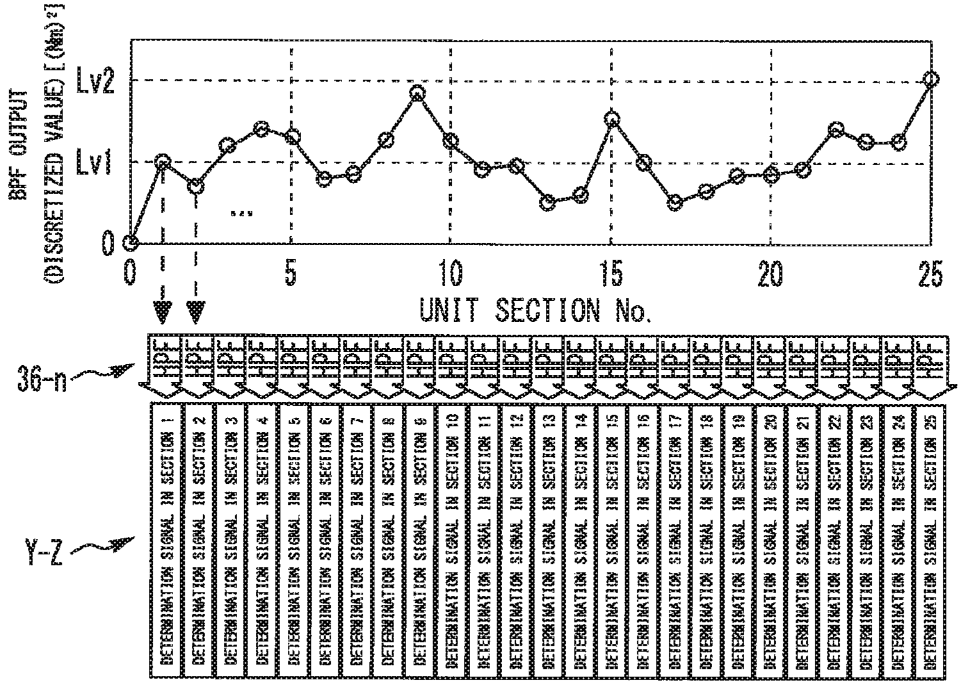
FIG. 27C is a view for illustrating the example of performing the first extraction unit and the second extraction unit.

FIG. 27 is a view for illustrating another example of performing of the first extraction unit and the second extraction unit. FIG. 27 shows the example in which the extraction unit 23 includes the high-pass filter 36. FIG. 27(*a*) shows the torque of the traction machine 11. The torque signal shown in FIG. 27(*a*) is input to the band-pass filter 32. FIG. 27(*b*) shows the output signal $u^2$ from the amplifier 33. The extraction unit 22 discretizes the continuous output signal $u^2$. In the same manner as in the example shown in FIG. 22, the extraction unit 22 outputs the discretized signal as the output signal Y from the band-pass filter 32.

In the example shown in FIG. 27 also, the section in which the car 1 moves is imaginarily divided into the plurality of vertically consecutive unit sections. For example, the extraction unit 22 extracts the signal $u^2$ having a maximum value in one of the unit sections as the output signal Y in the unit section.

The extraction unit 23 includes the high-pass filters 36 corresponding to the individual unit sections. For example, the high-pass filter 36 corresponding to the first unit section is referred to as a filter 36-1. The high-pass filter 36 corresponding to the second unit section is referred to as a filter 36-2. The high-pass filter 36 corresponding to the third unit section is referred to as a filter 36-3. Likewise, the high-pass filter 36 corresponding to the n-th unit section is referred to as a filter **36-*n***.

The output signal Y from the band-pass filter 32 when the car 1 moves in the first unit section is input to the filter 36-1. The filter 36-1 outputs a signal obtained by attenuating the trend component from the output signal Y. The output signal Y-Z from the filter 36-1 is the determination signal in the first unit section. The output signal Y from the band-pass filter 32 when the car 1 moves in the second unit section is input to the filter 36-2. The filter 36-2 outputs a signal obtained by attenuating the trend component from the output signal Y. The output signal Y-Z from the filter 36-2 is the determination signal in the second unit section.

The output signal Y from the band-pass filter 32 when the car 1 moves in the third unit section is input to the filter 36-3. The filter 36-3 outputs a signal obtained by attenuating the trend component from the output signal Y. The output signal Y-Z from the filter 36-3 is the determination signal in the third unit section. Likewise, the output signal Y from the band-pass filter 32 when the car 1 moves in the n-th unit section is input to the filter **36-*n*. The filter 36-*n* outputs a signal obtained by attenuating the trend component from the output signal Y. The output signal Y-Z from the filter 36-*n*** is the determination signal in the n-th unit section.

The detection unit 24 detects, on the basis of the determination signal extracted by the extraction unit 23, occurrence of an abnormal variation in the sensor signal (S103). The detection unit 24 detects, as the abnormal variation, a sudden variation occurred in the sensor signal. For example, the detection unit 24 determines whether or not a value of the determination signal extracted by the extraction unit 23 exceeds the first threshold. When the value of the determination signal extracted by the extraction unit 23 exceeds the first threshold, the detection unit 24 detects the occurrence of the abnormal variation in the sensor signal. The first threshold is stored in advance in the storage unit 21.

The controller 13 may set the first threshold by performing a specific operation in which the car 1 actually moves. For example, when the installation of the elevator is completed, a setting operation for setting the first threshold is performed. In the setting operation, the car 1 moves from the lowermost floor to the uppermost floor. The car 1 may moves from the uppermost floor to the lowermost floor. The signal Y output from the extraction unit 22 when the car 1 moves between the lowermost floor and the uppermost floor is stored in the storage unit 21. Then, a value obtained by multiplying a maximum value of the output signal Y stored in the storage unit 21 by a factor is set as the first threshold. The factor is a value of not less than 1. The factor may be 2. The factor may be adjusted depending on a magnitude of vibration occurring in the car 1 during a normal operation.

The controller 13 may perform a specific operation in which the car 1 actually moves and thus update the set first threshold. For example, at night when the elevator is used less frequently or the like, an updating operation for updating the first threshold is performed. Details of the updating operation may be the same as those of the setting operation descried above. For example, the controller 13 periodically performs the updating operation to update the first threshold. For example, the updating operation is monthly performed.

This allows the first threshold to be appropriately reset on the basis of a state of the elevator.

The controller 13 may perform the setting operation a plurality of times at different speeds of the car 1. For example, the controller 13 performs a first setting operation, while moving the car 1 at a first speed. By performing the first setting operation, the controller 13 sets a lower-speed first threshold. The controller 13 moves the car 1 at a second speed to perform a second setting operation. The second speed is higher than the first speed. By performing the second setting operation, the controller 13 sets a higher-speed first threshold. In the elevator apparatus in which a maximum speed of the car 1 can be changed, the detection unit 24 selects the appropriate first threshold corresponding to the maximum speed of the car 1. For example, when a higher-speed-mode operation is performed, the detection unit 24 compares the value of the determination signal to the higher-speed first threshold. When a lower-speed-mode operation is performed, the detection unit 24 compares the value of the determination signal to the lower-speed first threshold. Likewise, the controller 13 may perform a plurality of updating operations at different speeds of the car 1.

It may be possible that a lower-limit value of the first threshold is stored in the storage unit 21. For example, when the first threshold calculated through execution of the setting operation has not reached the lower limit value, the lower limit value is set as the first threshold. When the first threshold calculated through execution of the updating operation has not reached the lower limit value, the lower limit value is set as the first threshold. Thus, it is possible to prevent an extremely small value from being set as the first threshold.

The car position detection unit 25 detects the position of the car 1. For example, the car position detection unit 25 detects the car position on the basis of the rotation signal output from the encoder 18. The car position detection unit 25 may detect the car position by another method. For example, the traction machine 11 includes an encoder. The encoder included in the traction machine 11 is also an example of the sensor configured to output a signal corresponding to the position of the car 1. The car position detection unit 25 may detect the car position on the basis of the encoder signal from the traction machine 11. The function of detecting the position of the car 1 may be included in the governor 15. The function of detecting the car position may be included in the traction machine 11. In such cases, a signal indicative of the position of the car 1 is input to the controller 13.

When the occurrence of an abnormal variation in the sensor signal is detected by the detection unit 24, the car position at an occurrence time of the abnormal variation is stored in the storage unit 21. For example, in a case where the section in which the car 1 moves is divided into a plurality of unit sections, when the detection unit 24 detects an abnormal variation, information for specifying the unit section in which the variation occurred is stored in the storage unit 21.

When the occurrence of the abnormal variation in the sensor signal is detected by the detection unit 24, the determination unit 26 determines whether or not the main rope 4 has the broken portion 4*c* (S104). When the occurrence of the abnormal variation is detected by the detection unit 24, the determination unit 26 makes the determination on the basis of the car position at the occurrence time of the abnormal variation. For example, the determination unit 26 includes a reproducibility determining function 26-1 and a break determining function 26-2. The reproducibility determining function 26-1 determines whether or not the car position at which the abnormal variation occurred has reproducibility (S104-1). The break determining function 26-2 determines, on the basis of the result of the determination by the reproducibility determining function 26-1, whether or not the main rope 4 has the broken portion 4*c* (S104-2).

Figure 28A:
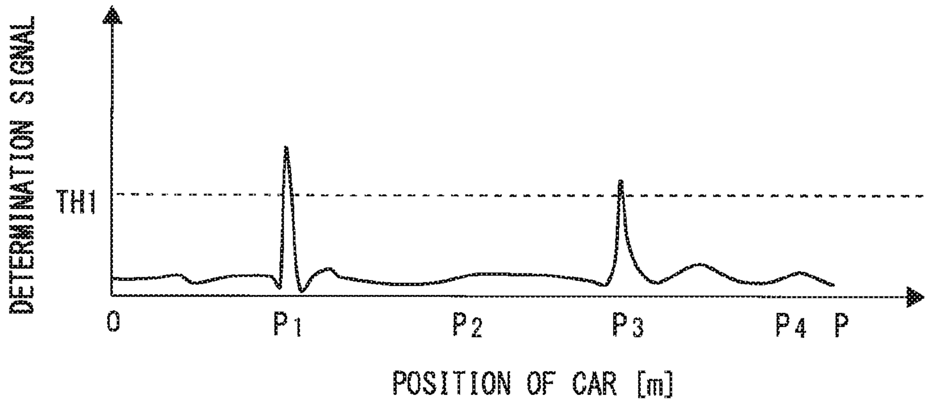
FIG. 28A is a view for illustrating an example of a reproducibility determining function.
Figure 28B:
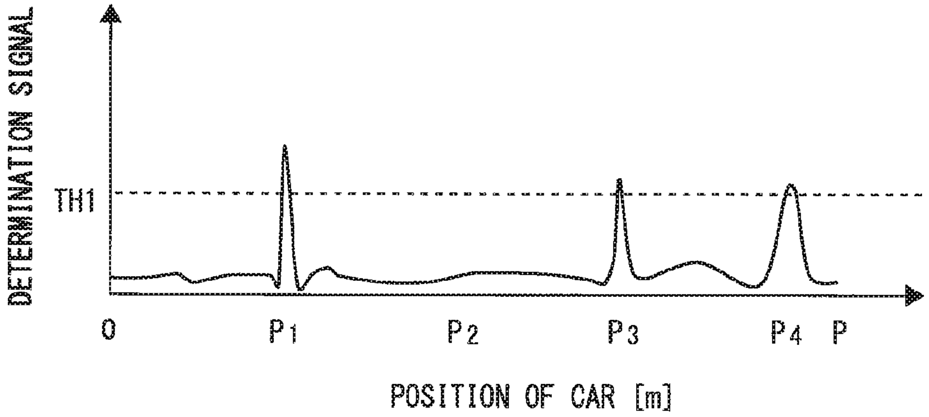
FIG. 28B is a view for illustrating an example of the reproducibility determining function.

FIG. 28 is a view for illustrating an example of the reproducibility determining function 26-1. FIG. 28(*a*) shows the most recent determination signal obtained when the car 1 moves from a position 0 to the position P. In the example shown in FIG. 28(*a*), at each of the position $P_1$ and a position $P_3$, the value of the determination signal exceeds a first threshold TH1. FIG. 28(*b*) shows the determination signal obtained when the car 1 previously moved in the same section. In other words, the determination signal shown in FIG. 28(*a*) is the signal acquired when the car 1 moves again in the same section immediately after the determination signal shown in FIG. 28(*b*) is acquired. In the example shown in FIG. 28(*b*), at the positions $P_1$, $P_3$, and $P_4$, the values of the determination signal exceed the first threshold TH1.

The reproducibility determining function 26-1 determines that there is reproducibility, for example, in a case where, when the car 1 passes through the same position a plurality of times, the value of the determination signal consecutively exceeds the first threshold twice. For example, at each of the positions $P_1$ and $P_3$, the value of the determination signal consecutively exceeds the first threshold TH1 twice. Accordingly, the reproducibility determining function 26-1 determines that there is reproducibility at each of the positions $P_1$ and $P_3$. On the other hand, at the position $P_4$, a most recent value of the determination signal does not exceed the first threshold TH1. In such a case, the reproducibility determining function 26-1 does not determine that there is reproducibility at the position $P_4$. The reproducibility determining function 26-1 determines that the value at the position $P_4$ shown in FIG. 28(*b*) resulted from an event having no reproducibility. For example, the reproducibility determining function 26-1 determines that the value at the position $P_4$ shown in FIG. 28(*b*) resulted from a passenger jumping up and down in the car 1.

Note that, when the section in which the car 1 moves is divided into a plurality of unit sections, for example, a determination as shown below is made. In a case where, when the car 1 passes through a given unit section a plurality of times, the value of the determination signal consecutively exceeds the first threshold twice, the reproducibility determining function 26-1 determines that there is reproducibility in the given unit section. For example, when the value of the determination signal obtained when the car 1 passes through a fifth unit section consecutively exceeds the first threshold TH1 twice, the reproducibility determining function 26-1 determines that there is reproducibility in the fifth unit section.

The reproducibility determining function 26-1 may determine that there is reproducibility when the value of the determination signal consecutively exceeds the first threshold three or more times. The number of times based on which the reproducibility determining function 26-1 determines that there is reproducibility is arbitrarily set.

When it is determined by the reproducibility determining function 26-1 that the car position at which the abnormal variation occurred has reproducibility, the break determining function 26-2 determines that the broken portion 4*c* is present in the main rope 4. When it is determined by the break determining function 26-2 that the broken portion 4*c* is present, the operation control unit 27 stops the car 1 at the nearest floor (S105). Also, the notification unit 28 notifies a management company for the elevator (S106).

The break detection device shown in the present embodiment uses the sensor of which the output signal varies when vibration occurs in the main rope 4 to detect the presence of the broken portion 4*c*. As the sensor signal, for example, the load signal, the speed deviation signal, and the torque signal can be used. Accordingly, the break detection device shown in the present embodiment need not include a dedicated sensor to determine the presence or absence of the broken portion 4*c*. As long as there is at least one sensor, the presence of the broken portion 4*c* can be detected. The break detection device need not include a large number of sensors to determine the presence or absence of the broken portion 4*c*. This allows a configuration of the break detection device to be simplified.

In the break detection device shown in the present embodiment, by attenuating the trend component from the vibration component extracted by the extraction unit 22, the determination signal is extracted. Accordingly, even when a variation resulting from any of the joints between the rail members 20 is included in the sensor signal, detection accuracy does not deteriorate. Even when a variation resulting from an abnormality in any of the sheaves is included in the sensor signal, the detection accuracy does not deteriorate. The break detection device shown in the present embodiment can accurately detect the presence of the broken portion 4*c*.

In the present embodiment, the description has been given of an example in which, during a period from when the car 1 starts to move to when the car 1 stops, the break detection device constantly performs the same operation. This is only exemplary. For example, in the elevator apparatus, when the car 1 starts to move, a transient response resulting from a difference between a mass of the car 1 and a mass of the counterweight 3 occurs in speed control. Accordingly, immediately after the car 1 starts to move, a variation is likely to occur in the torque signal from the traction machine 11 and the like. To prevent the detection accuracy from being degraded by such a variation, the function of the extraction unit 22 may be stopped immediately after the car 1 starts to move. Alternatively, immediately after the car 1 starts to move, the output signal Y from the band-pass filter 32 may be forcibly set to 0.

In another example which prevents the degradation of the detection accuracy, immediately after the car 1 starts to move, the detection unit 24 may detect the occurrence of an abnormal variation in the sensor signal when the value of the determination signal exceeds a second threshold. The second threshold is larger than the first threshold. Note that the expression "immediately after the car 1 starts to move" means, for example, a period from when the car 1 starts to move to when the speed of the car 1 becomes a speed $V_1$. The speed $V_1$ is stored in advance in the storage unit 21. The expression "immediately after the car 1 starts to move" may means a period after the car 1 starts to move to when an acceleration rate of the car 1 becomes constant.

In the elevator apparatus, ripple occurs in the torque of the traction machine 11. To prevent the detection accuracy from being degraded by the torque ripple, immediately after the car 1 starts to move and immediately before the car 1 stops, the function of the extraction unit 22 may be stopped. Alternatively, immediately after the car 1 starts to move and immediately before the car 1 stops, the output signal Y from the band-pass filter 32 may be forcibly set to 0.

In still another example which prevents the degradation of the detection accuracy, immediately after the car 1 starts to move and immediately before the car 1 stops, the detection unit 24 may detect the occurrence of an abnormal variation in the sensor signal when the value of the determination signal exceeds a third threshold. The third threshold is larger than the first threshold. Note that the expression "immediately after the car 1 starts to move and immediately before the car 1 stops" means, for example, a period during which the speed of the car 1 is lower than a speed V2. The speed V2 is stored in advance in the storage unit 21. The speed V2 is set to, for example, a speed at which a frequency band of the torque ripple of the traction machine 11 falls outside a particular frequency band resulting from contact of the broken portion 4*c* with the rope guide.

In the example shown in the present embodiment, the section in which the car 1 moves is divided into the plurality of unit sections. The following will describe a preferred example of the division.

In the example shown in FIG. 22, when the occurrence of an abnormal variation in the sensor signal is detected by the detection unit 24, for example, a number of the unit section in which the abnormal variation occurred is stored in the storage unit 21. When the section in which the car 1 moves is divided into n unit sections, the storage unit 21 is required to have n storage regions each for storing the occurrence of the abnormal variation. As a result, when the number of the divided unit sections increases, the position at which the broken portion 4*c* is present can accurately be specified, but a capacity of the storage unit 21 should be increased. On the other hand, when the number of the divided unit sections is small, the capacity of the storage unit 21 need not be increased, but the position at which the broken portion 4*c* is present cannot accurately be specified.

Figure 29:
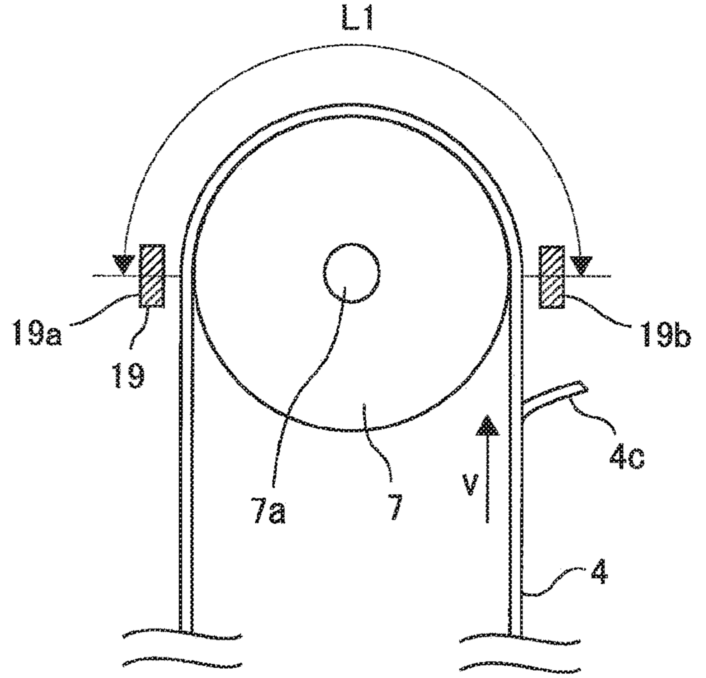
FIG. 29 is a view showing a cross section of the return sheave.

FIG. 29 is a view showing a cross section of the return sheave 7. In an example shown in FIG. 29, the broken portion 4*c* of the main rope 4 comes into contact with the facing portion 19*b* of the rope guide 19, and then comes into contact with the facing portion 19*a* thereof. A variation occurring in the sensor signal when the broken portion 4*c* comes into contact with the facing portion 19*b* and a variation occurring in the sensor signal when the broken portion 4*c* comes into contact with the facing portion 19*a* need not successfully be detected as different abnormal variations. When it is assumed that L1 represents a length of a section of the main rope 4 between a portion of the main rope 4 facing the facing portion 19*b* and a portion thereof facing the facing portion 19*a*, even when a height of each of the unit sections is larger than the rope length L1, no problem is encountered. For example, the rope length L1 is determined on the basis of a smallest one of the sheaves around which the main rope 4 is wound. The rope length L1 may be determined on the basis of a most commonly-sized one of the sheaves around which the main rope 4 is wound.

Figure 30:
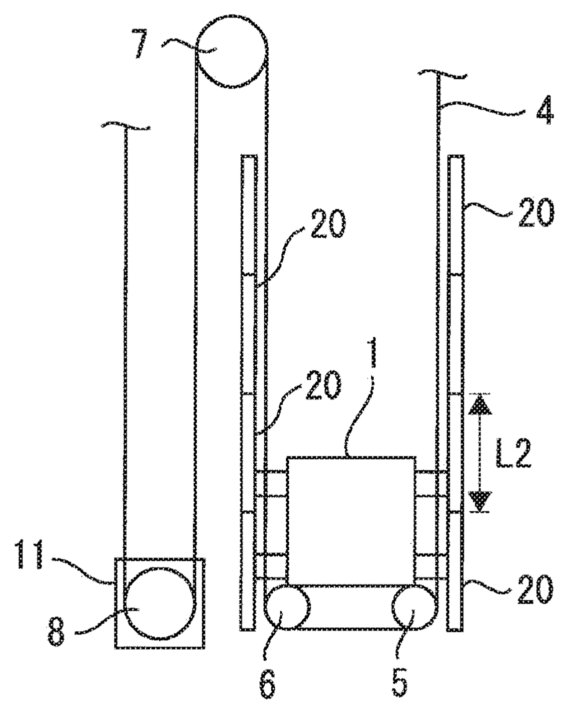
FIG. 30 is a view showing a car guided by guide rails.

FIG. 30 is a view showing the car 1 guided by the guide rails. As described above, each of the guide rails includes the plurality of rail members 20. Preferably, a variation occurring in the sensor signal when the car 1 passes through a given joint between the rail members 20 and a variation occurring in the sensor signal when the car 1 passes through a joint located immediately above the given joint are detected as different abnormal variations. When it is assumed that L2 represents a length of each of the rail members 20, the height of the unit section is preferably smaller than the length L2 of the rail member 20. For example, the length L2 is determined on the basis of the rail member 20 which is shortest among the rail members 20. The length L2 may be determined on the basis of a length of the most commonly-used one of the rail members 20.

When it is assumed that H represents the height of each of the unit sections, it is optimum that the height H of the unit section satisfies the following condition:

[Rope Length $L1$]≤[Height $H$]≤[Length $L2$ of Rail Member 20].

In the example described in the present embodiment, the presence of the broken portion 4*c* is detected without consideration of a direction in which the car 1 moves. This is only exemplary. It may be possible to detect the presence of the broken portion 4*c* by separately considering a case where the car 1 moves upward and a case where the car 1 moves downward.

In such a case, when the occurrence of an abnormal variation in the sensor signal is detected by the detection unit 24, the car position and a moving direction of the car 1 when the variation occurred are stored in the storage unit 21. The reproducibility determining function 26-1 determines whether or not the car position at which the abnormal variation occurred has reproducibility in consideration also of the moving direction of the car 1.

When consideration is given to the moving direction of the car 1, for example, a setting operation for ascent in which the car 1 moves from the lowermost floor to the uppermost floor is performed, and a first threshold for ascent is set. A setting operation for descent in which the car 1 moves from the uppermost floor to the lowermost floor is performed, and a first threshold for descent is set. In addition, an updating operation for ascent in which the car 1 moves from the lowermost floor to the uppermost floor is performed, and the first threshold for ascent is updated. A setting operation for descent in which the car 1 moves from the uppermost floor to the lowermost floor is performed, and the first threshold for descent is updated. The reproducibility determining function 26-1 determines that there is reproducibility in a case where, for example, when the car 1 passes through the same position in the same direction, the value of the determination signal consecutively exceeds the first threshold twice.

In the example described in the present embodiment, the reproducibility determining function 26-1 determines that there is reproducibility in the case where, when the car 1 passes through the same position, the value of the determination signal consecutively exceeds the first threshold a plurality of times. This is only exemplary. The determination unit 26 may determine whether or not the main rope 4 has the broken portion 4*c* on the basis of a frequency with which the occurrence of an abnormal variation is detected by the detection unit 24 when the car 1 passes through the same position.

For example, when the occurrence of an abnormal variation in the sensor signal is detected by the detection unit 24, the car position at an occurrence time of the abnormal variation is stored in the storage unit 21. When the section in which the car 1 moves is divided into a plurality of unit sections, the number of the unit section in which the variation occurred is stored in the storage unit 21. For example, in the storage unit 21, storage regions corresponding to the individual unit sections are formed. In a case where the occurrence of an abnormal variation when the car 1 moves in a given one of the unit sections is detected by the detection unit 24, 1 is stored in the storage region corresponding to the given unit section. In a case where the occurrence of an abnormal variation when the car 1 moves in a given one of the unit sections is not detected by the detection unit 24, 0 is stored in the storage region corresponding to the given unit section.

The reproducibility determining function 26-1 arithmetically determines, for example, a moving average value of the values stored in the storage regions as the foregoing frequency. For example, the reproducibility determining function 26-1 arithmetically determines the moving average value when the car 1 passes through the same position four times. The break determining function 26-2 determines whether or not the main rope 4 has the broken portion 4*c* on the basis of the frequency arithmetically determined by the reproducibility determining function 26-1. For example, the break determining function 26-2 determines that the main rope 4 has the broken portion 4*c* when the moving average value arithmetically determined by the reproducibility determining function 26-1 exceeds the first determination threshold. The first determination threshold is stored in advance in the storage unit 21.

Figure 31:
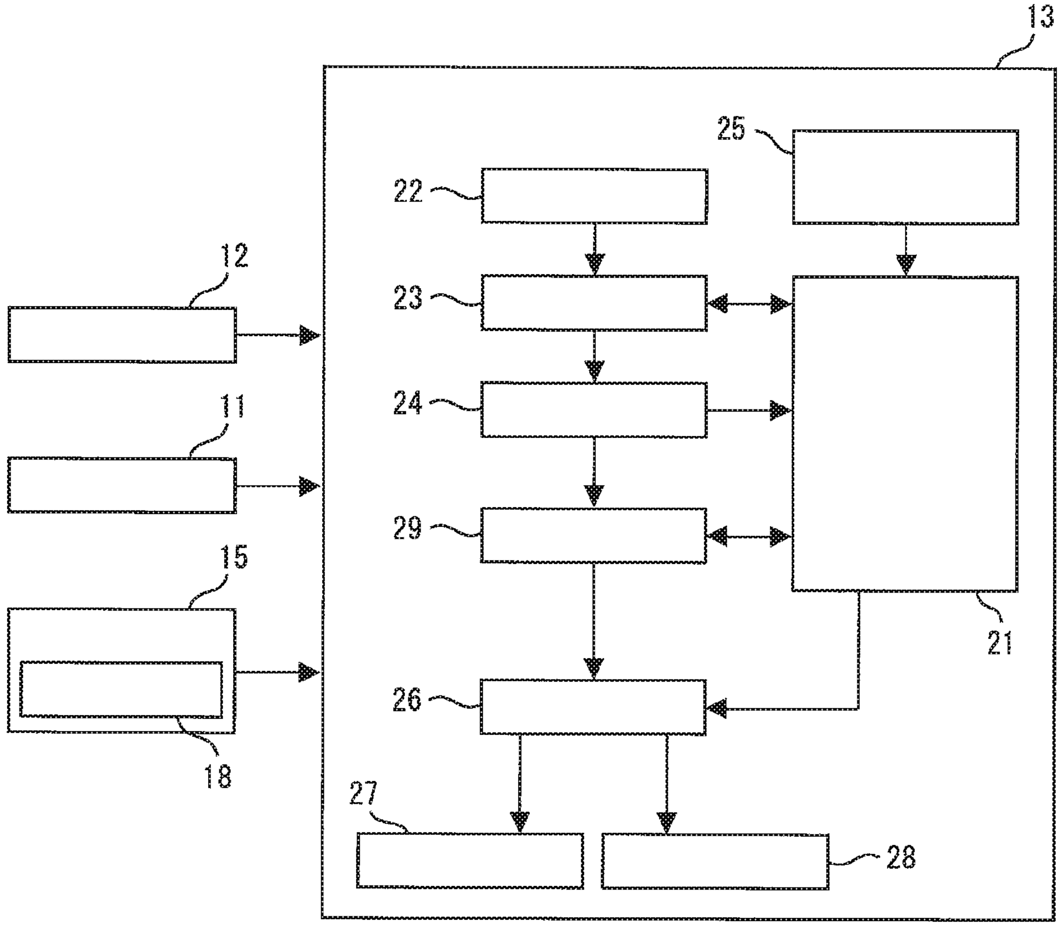
FIG. 31 is a view showing another example of the break detection device in the first embodiment.

FIG. 31 is a view showing another example of the break detection device in the first embodiment. In the example shown in FIG. 31, the controller 13 is different from that in the example shown in FIG. 13 in further including an arithmetic unit 29.

In the example shown in FIG. 31, the storage unit 21 stores a determination score for determining whether or not the broken portion 4*c* is present. The arithmetic unit 29 arithmetically determines the determination score on the basis of the result of the detection by the detection unit 24. For example, when the occurrence of an abnormal variation in the sensor signal is detected by the detection unit 24, the car position at the occurrence time of the abnormal variation is associated with the determination score and stored in the storage unit 21. The determination unit 26 determines whether or not the main rope 4 has the broken portion 4*c* on the basis of the determination score stored in the storage unit 21. Note that, when the section in which the car 1 moves is divided into a plurality of unit sections, the determination scores corresponding to the individual unit sections are stored in the storage unit 21.

Figure 32:
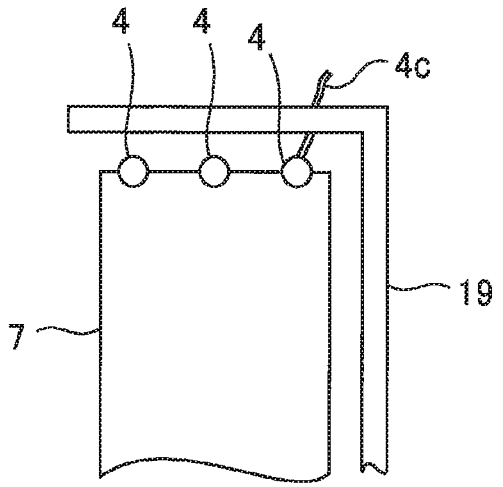
FIG. 32 is a view showing an example of a broken portion.
Figure 33:
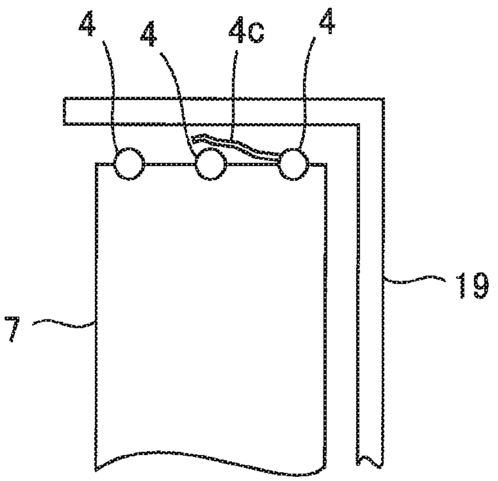
FIG. 33 is a view showing an example of a broken portion.
Figure 34A:
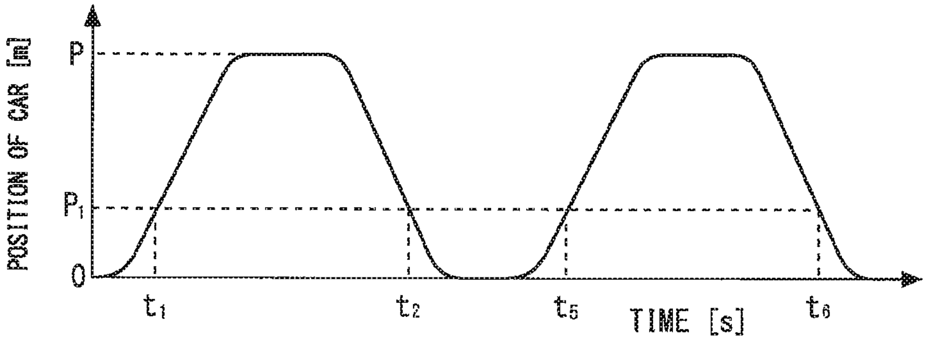
FIG. 34A is a view for illustrating an example of functions of an arithmetic unit and a determination unit.
Figure 34B:
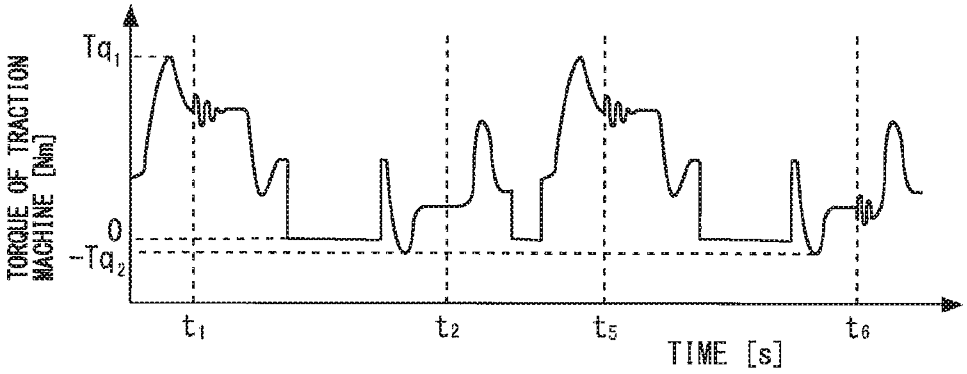
FIG. 34B is a view for illustrating the example of the functions of the arithmetic unit and the determination unit.
Figure 34C:
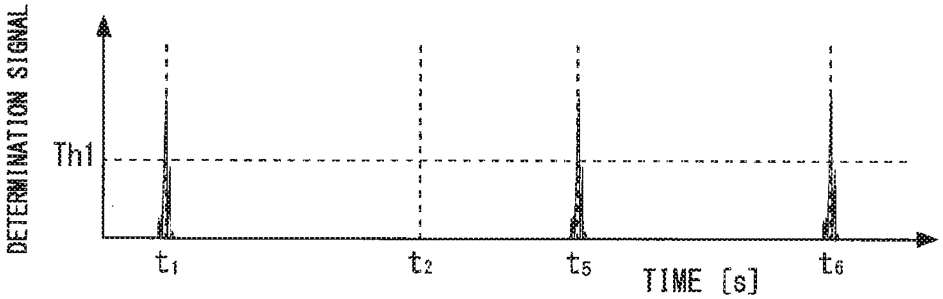
FIG. 34C is a view for illustrating the example of the functions of the arithmetic unit and the determination unit.
Figure 34D:
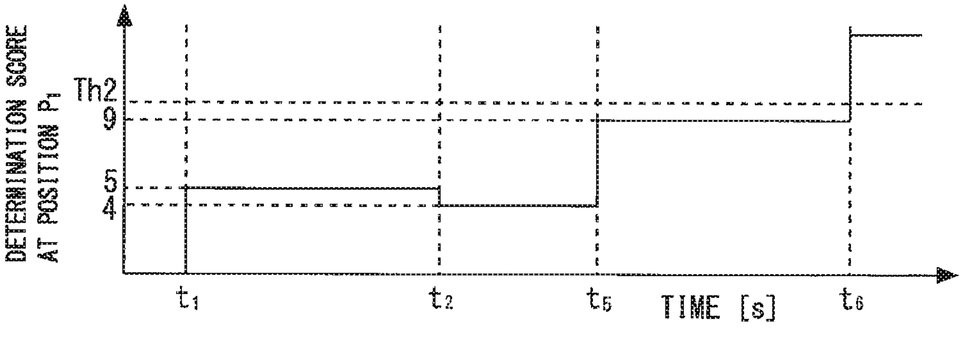
FIG. 34D is a view for illustrating the example of the functions of the arithmetic unit and the determination unit.

FIGS. 32 and 33 are views showing examples of the broken portion 4*c*. FIG. 32 shows the example in which the broken portion 4*c* goes away from the return sheave 7 toward a tip end thereof. When the broken portion 4*c* protrudes from a surface of the main rope 4 as shown in FIG. 32, the broken portion 4*c* comes into contact with the rope guide 19 when passing through the return sheave 7. FIG. 33 shows the example in which the broken portion 4*c* is disposed so as to extend along a surface of the return sheave 7. When the broken portion 4*c* protrudes from the surface of the main rope 4 as shown in FIG. 33, the broken portion 4*c* does not come into contact with the rope guide 19 when passing through the return sheave 7. Consequently, even when the broken portion 4*c* passes through the return sheave 7, no vibration occurs in the main rope 4.

An orientation of the broken portion 4*c* may be changed as a result of contact of the broken portion 4*c* with the rope guide 19. When the orientation of the broken portion 4*c* is changed from the orientation shown in FIG. 32 to the orientation shown in FIG. 33, variation no longer occurs in the main rope 4 even though the broken portion 4*c* passes through the return sheave 7. On the other hand, the orientation of the broken portion 4*c* may be changed when the broken portion 4*c* is pressed by a surface of the groove on passing through the return sheave 7. The orientation of the broken portion 4*c* may be changed when the wire or the strand is further raveled. When the orientation of the broken portion 4*c* is changed from the orientation shown in FIG. 33 to the orientation shown in FIG. 32, vibration occurs in the main rope 4 when the broken portion 4*c* passes through the return sheave 7.

FIG. 34 is a view for illustrating an example of the functions of the arithmetic unit 29 and the determination unit 26. FIG. 34(*a*) shows the position of the car 1. FIG. 34(*b*) shows the torque of the traction machine 11. FIG. 34(*c*) shows the determination signal. FIG. 34(*d*) shows an example of transition of the determination score.

In the example shown in FIG. 34, the car 1 makes two round trips between the lowermost floor and the position P. The car 1 passes through the position $P_1$ at a time $t_1$, at a time $t_2$, at a time $t_5$, and at a time $t_6$. FIG. 34 shows the example in which the main rope 4 has the broken portion 4*c*. The broken portion 4*c* passes through the return sheave 7 at the time $t_1$, at the time $t_2$, at the time $t_5$, and at the time $t_6$. As described above, even when the main rope 4 has the broken portion 4*c*, the broken portion 4*c* does not always come into contact with the rope guide 19. In the example shown in FIG. 34, the broken portion 4*c* comes into contact with the rope guide 19 at the time $t_1$, at the time $t_5$, and at the time $t_6$. The broken portion 4*c* does not come into contact with the rope guide 19 at the time $t_2$.

For example, when the broken portion 4*c* comes into contact with the rope guide 19 at the time $t_1$, the value of the determination signal exceeds the first threshold. As a result, the detection unit 24 detects the occurrence of an abnormal variation in the sensor signal. For example, a case where the position $P_1$ is included in an eighth unit section is considered. At the time $t_1$, the determination score of the eighth unit section is set to an initial value. For example, the initial value is 0. When the occurrence of an abnormal variation is detected by the detection unit 24 when the car 1 passes through the eighth unit section, the arithmetic unit 29 adds a given value to the determination score of the eighth unit section. FIG. 34(*d*) shows the example in which the given value to be added is 5.

The determination unit 26 determines whether or not the determination score stored in the storage unit 21 exceeds a second determination threshold. The second determination threshold is stored in advance in the storage unit 21. FIG. 34(*d*) shows the example in which the second determination threshold is 10. At the time $t_1$, the determination score of the eighth unit section has not exceeded the second determination threshold. When the determination score has not exceeded the second determination threshold, the determination unit 26 determines that the main rope 4 does not have the broken portion 4*c*.

The car 1 passes the position $P_1$ again at the time $t_2$. At the time $t_2$, the broken portion 4*c* does not come into contact with the rope guide 19. When the occurrence of an abnormal variation is not detected by the detection unit 24 when the car 1 passes through a position at which the determination score is not 0, the arithmetic unit 29 reduces the determination score at that position. At the time $t_2$, the determination score of the eighth unit section is not 0. At the time $t_2$, the arithmetic unit 29 reduces a given value from the determination score of the eighth unit section. FIG. 34(*d*) shows the example in which the given value to be reduced is 1.

At the time $t_5$, the car 1 passes through the position $P_1$ again. At the time $t_5$, the detection unit 24 detects the occurrence of an abnormal variation in the sensor signal. Consequently, the arithmetic unit 29 adds 5 to the determination score of the eighth unit section stored in the storage unit 21. At the time $t_5$, the determination score of the eighth unit section has not exceeded the second determination threshold. Accordingly, the determination unit 26 determines that the main rope 4 does not have the broken portion 4*c*.

Subsequently, at the time $t_6$, the car 1 passes through the position $P_1$ again. The detection unit 24 detects the occurrence of an abnormal variation in the sensor signal at the time $t_6$. Consequently, the arithmetic unit 29 further adds 5 to the determination score of the eighth unit section stored in the storage unit 21. The determination score of the eighth unit section stored in the storage unit 21 becomes 14 at the time $t_6$. At the time $t_6$, the determination score of the eighth unit section exceeds the second determination threshold. Accordingly, the determination unit 26 determines that the main rope 4 has the broken portion 4*c* at the time $t_6$.

In the example shown in FIG. 34, even when a time period during which the broken portion 4*c* does not come into contact with the rope guide 19 appears, it is possible to detect the presence of the broken portion 4*c*.

In a case where the section in which the car 1 moves is not divided into a plurality of unit sections, when the car 1 passes through the car position stored in the storage unit 21 again and the detection unit 24 detects an abnormal variation at that moment, a given value is added to the determination score at the position. When the car 1 passes through the position of concern again and an abnormal variation is not detected by the detection unit 24 at that moment, a given value is subtracted from the determination score at the position. In such a case, as long as a distance from the car position stored in the storage unit 21 to the position is equal to or smaller than a reference distance, the position may be regarded as identical to the stored car position. The reference distance is set to, for example, the rope length L1.

Preferably, the second determination threshold is equal to or more than twice the value to be added to the determination score. As long as the second determination threshold is equal to or more than twice the value to be added to the determination score, it is possible to inhibit erroneous detection resulting from an event having no reproducibility. In consideration also of the probability that the broken portion 4*c* does not consecutively come into contact with the rope guide 19, the value to be subtracted from the determination score is preferably equal to or less than one half of the value to be added.

The second determination threshold may be variable depending on a magnitude of the determination signal. For example, as the second determination threshold, a first value and a second value are set in advance. The second value is larger than the first value. When the magnitude of the determination signal is equal to or less than a reference value, as the second determination threshold, the second value is used. Specifically, when such a variation as to allow the magnitude of the determination signal to exceed the reference value occurs in the sensor signal, the presence of the broken portion 4*c* can be detected at an early stage. By way of example, when Condition 1 shown below is satisfied, the second determination threshold is set to 15. When Condition 2 shown below is satisfied, the second determination threshold is set to 10.

$$[\text{First Threshold}] \leq [\text{Determination Signal}] \leq 2\times[\text{First Threshold}] \qquad \text{Condition 1:}$$

$$2\leq[\text{First Threshold}] < [\text{Determination Signal}] \qquad \text{Condition 2:}$$

Second Embodiment

Figure 35A:
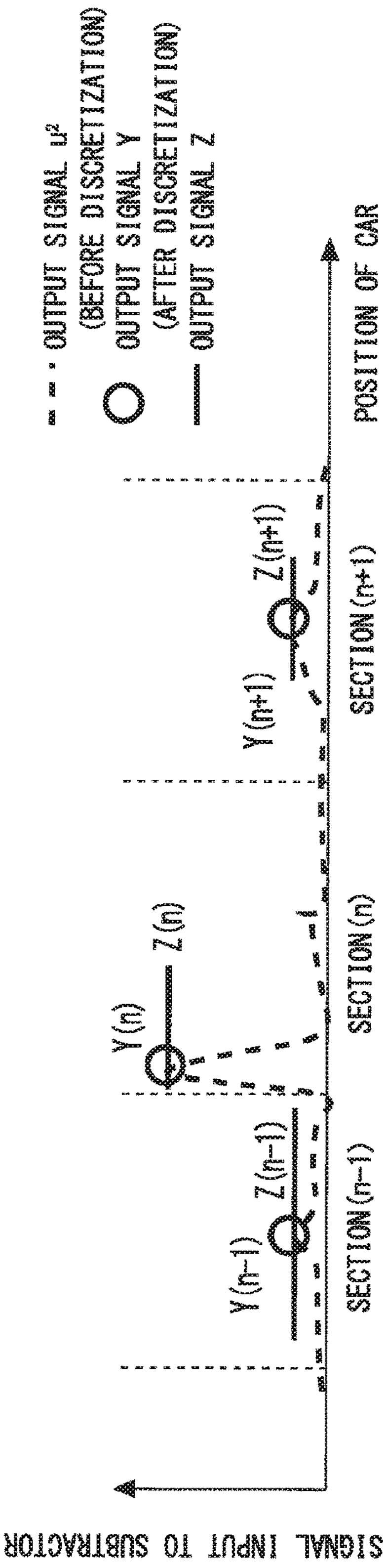
FIG. 35A is a view showing an example of signals input to a subtractor of the second extraction unit.
Figure 35B:
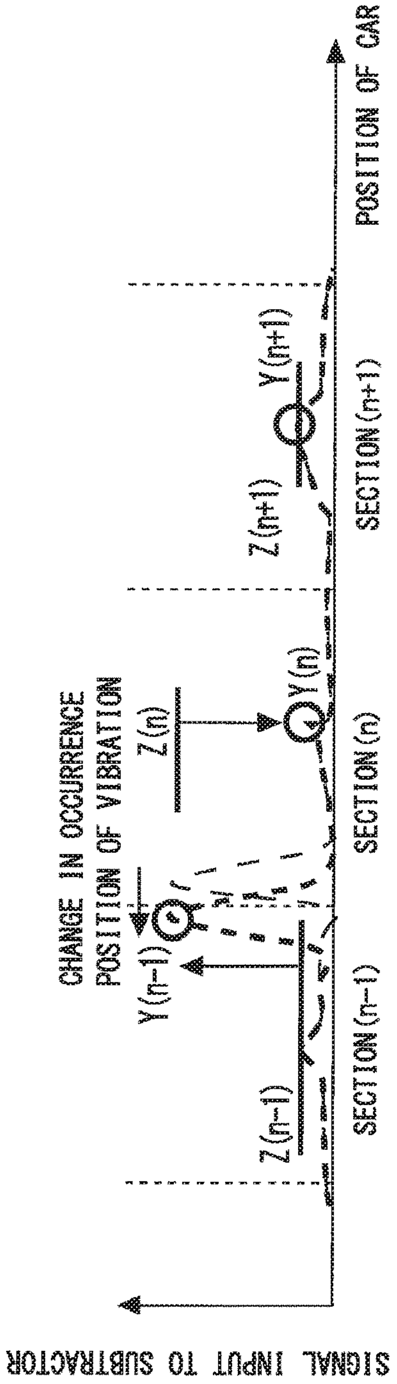
FIG. 35B is a view showing an example of signals input to the subtractor of the second extraction unit.

FIG. 35 is a view showing examples of signals input to the subtractor 35 of the second extraction unit. In FIG. 35, each of broken lines represents the output signal $u^2$ from the amplifier 33. Specifically, each of the broken lines represents the output signal Y before discretization. Each of blank circles represents the discretized output signal Y. Each of solid lines represents the output signal Z from the low-pass filter 34. In FIG. 35, each of abscissa axes represents the car position. FIG. 35 shows signals obtained when the car 1 passes through an (n−1)-th unit section, the n-th unit section, and an (n+1)-th unit section.

FIG. 35(*a*) shows an example in which, in the n-th unit section, an output signal Y(n) exceeding the first threshold is present. When the output signal Y(n) is generated due to a joint between the rail members 20, an output signal Z(n) in the n-th unit section follows the output signal Y(n). A value of the output signal Z(n) becomes similar to a value of the output signal Y(n). Consequently, an output signal Y(n)-Z(n) serving as the determination signal in the n-th unit section has a value smaller than the first threshold. In the example shown in FIG. 35(*a*), in each of the (n−1)-th unit section, the n-th unit section, and the (n+1)-th unit section, the detection unit 24 does not detect the occurrence of an abnormal variation in the sensor signal.

FIG. 35(*b*) shows the signal when, immediately after the signal shown in FIG. 35(*a*) is acquired, the car 1 passes through the (n−1)-th unit section, the n-th unit section, and the (n+1)-th unit section again. In the example shown in FIG. 35(*b*), in the (n−1)-th unit section, there is an output signal Y(n−1) exceeding the first threshold. The output signal Y(n−1) shown in FIG. 35(*b*) corresponds to the output signal Y(n) shown in FIG. 35(*a*) that is shifted into the (n−1)-th unit section. Such an event occurs as a result of, for example, elongation of the main rope 4.

In the example shown in FIG. 35(*b*), an output signal Z(n−1) in the (n−1)-th unit section does not follow a rapid change of the output signal Y(n−1). As a result, when an output signal Y(n−1)-Z(n−1) serving as the determination signal in the (n−1)-th unit section is larger than the first threshold, the break determining function 26-2 may determine that the broken portion 4*c* is present. Note that, in the n-th unit section, the output signal Y(n) rapidly decreases. The output signal Z(n) does not follow a rapid change of the output signal Y(n). Accordingly, an output signal Y(n)-Z(n) serving as the determination signal in the n-th unit section has a negative value.

In the present embodiment, a description will be given of a function for preventing such erroneous detection. An example of the break detection device in the present embodiment is the same as the example shown in FIG. 13. As a function not disclosed in the present embodiment, any of the functions disclosed in the first embodiment may be adopted. For example, the controller 13 may further include the arithmetic unit 29.

Figure 36A:
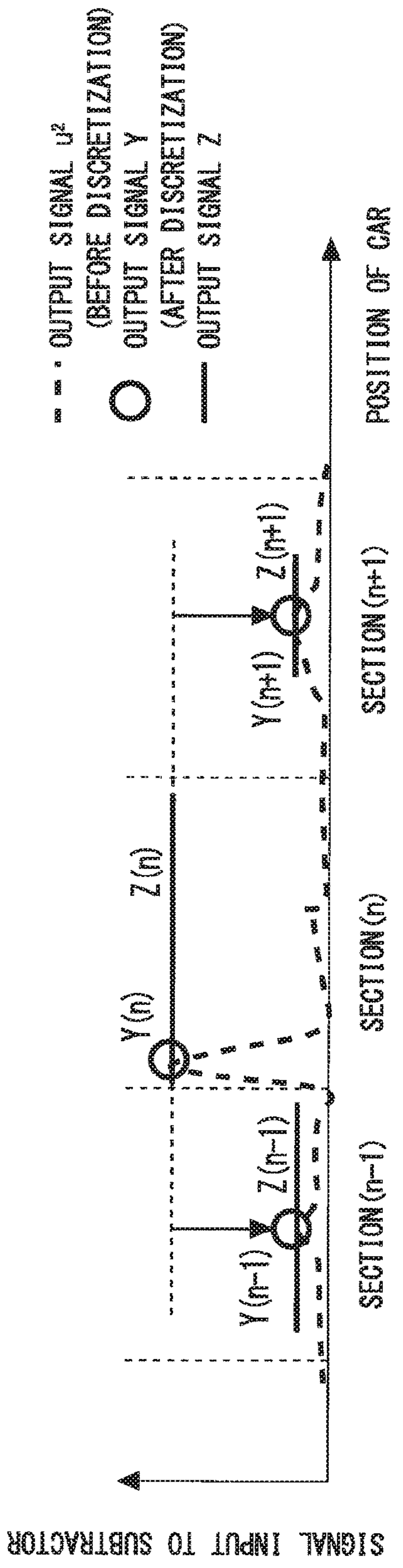
FIG. 36A is a view for illustrating an example of a function of the second extraction unit.
Figure 36B:
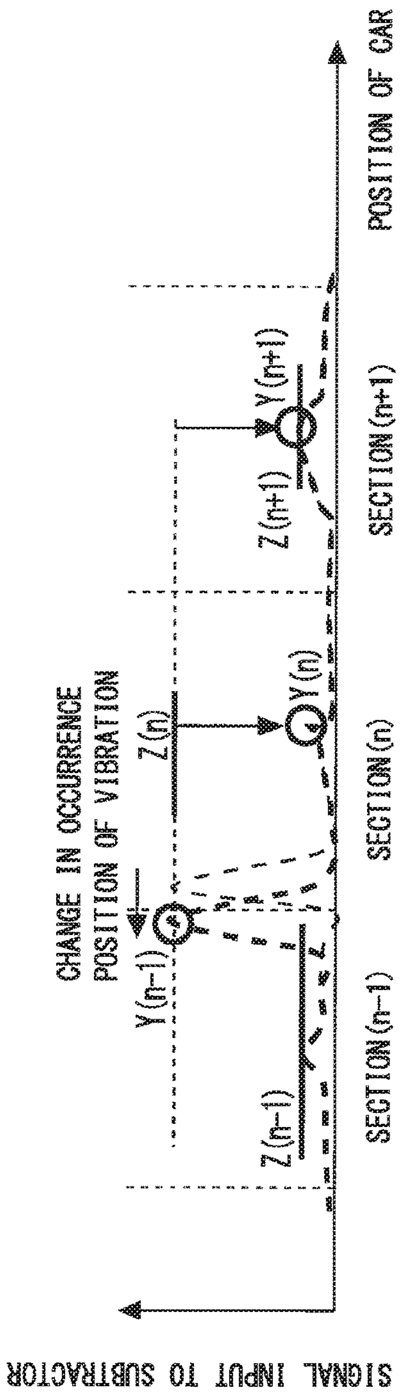
FIG. 36B is a view for illustrating the example of the function of the second extraction unit.

FIG. 36 is a view for illustrating an example of the function of the second extraction unit. FIG. 36(*a*) is a view corresponding to FIG. 35(*a*). FIG. 36(*b*) is a view corresponding to FIG. 35(*b*). In the example shown in the present embodiment, the extraction unit 23 outputs, as the determination signal, the signal Y-Z in consideration also of values of the output signals in adjacent unit sections in regard to the output signal Z from the low-pass filter 34. For example, the extraction unit 23 outputs the determination signal as shown below.

$$(n-1)\text{-th Unit Section: } Y(n-1)-\max(Z(n-2),Z(n-1),Z(n))$$

$$n\text{-th Unit Section: } Y(n)-\max(Z(n-1),Z(n),Z(n+1))$$

$$(n+1)\text{-th Unit Section: } Y(n+1)-\max(Z(n),Z(n+1),Z(n+2))$$

The following will describe an example in which the determination signal in the n-th unit section is arithmetically determined. The n-th unit section is the section immediately below the (n+1)-th unit section and immediately above the (n−1)-th unit section. The extraction unit 23 specifies, from among the output signal Z(n) in the unit section of concern, the output signal Z(n−1) in the unit section immediately below, and the output signal Z(n+1) in the unit section immediately above, the output signal having a maximum value. In the example shown in FIG. 36(*a*), the output signal Z(n) has a largest value from among the foregoing three signals. The extraction unit 23 outputs, as the determination signal, a differential signal between the output signal Y(n) in the unit section of concern and the output signal Z(n) specified as the signal having the largest value.

The extraction unit 23 similarly arithmetically determines the determination signal also for each of the (n−1)-th unit section and the (n+1)-th unit section. In the example shown in FIG. 36(*a*), the determination signals are arithmetically determined as shown below.

$$(n-1)\text{-th Unit Section: } Y(n-1)-Z(n)<0$$

$$n\text{-th Unit Section: } Y(n)-Z(n)\approx 0$$

$$(n+1)\text{-th Unit Section: } Y(n+1)-Z(n)<0$$

It is assumed that, in the example shown in FIG. 36(*a*), a value of the output signal Z(n−2) is smaller than a value of the output signal Z(n), and that a value of the output signal Z(n+2) is smaller than the value of the output signal Z(n).

FIG. 36(*b*) shows the signal when, immediately after the signal shown in FIG. 36(*a*) is acquired, the car 1 passes through the (n−1)-th unit section, the n-th unit section, and the (n+1)-th unit section again. The output signal Y(n−1) shown in FIG. 36(*b*) corresponds to the output signal Y(n) shown in FIG. 36(*a*) that is shifted into the (n−1)-th unit section.

In the example shown in FIG. 36(*b*), the determination signals are arithmetically determined as follows.

$$(n-1)\text{-th Unit Section: } Y(n-1)-Z(n)\approx 0$$

$$n\text{-th Unit Section: } Y(n)-Z(n)<0$$

$$(n+1)\text{-th Unit Section: } Y(n+1)-Z(n)<0$$

In the example shown in the present embodiment, it is possible to prevent a variation in the sensor signal resulting from any of the joints between the rail members 20 from being erroneously detected as a variation in the sensor signal resulting from the broken portion 4*c*.

Third Embodiment

Figure 37:
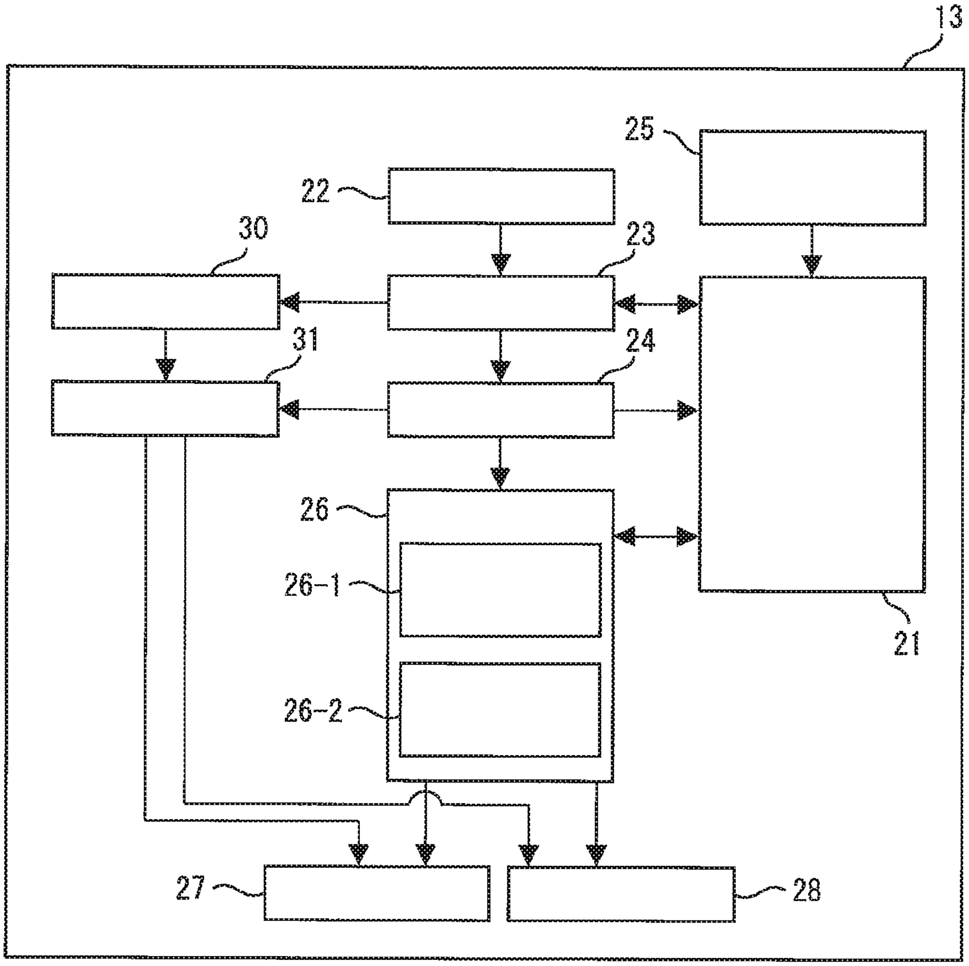
FIG. 37 is a view showing an example of the break detection device in a third embodiment.

FIG. 37 is a view showing an example of the break detection device in a third embodiment. In the example shown in FIG. 37, the controller 13 is different from that in the example shown in FIG. 13 in that the controller 13 further includes a detection unit 30 and a determination unit 31. As a function not disclosed in the present embodiment, any of the functions disclosed in the first or second embodiment may be adopted. For example, the controller 13 may further include the arithmetic unit 29.

The detection unit 30 detects, on the basis of a vibration component extracted by the extraction unit 22, occurrence of an abnormal variation in the sensor signal. For example, the detection unit 30 determines whether or not a value of the vibration component extracted by the extraction unit 22 has exceeded a fourth threshold. When the value of the vibration component extracted by the extraction unit 22 has exceeded the fourth threshold, the detection unit 30 detects the occurrence of an abnormal variation in the sensor signal. The fourth threshold is stored in advance in the storage unit 21.

The determination unit 31 determines a specific abnormality occurred in the elevator on the basis of a result of the detection by the detection unit 24 and a result of the detection by the detection unit 30. The determination unit 31 determines an abnormality other than the presence of the broken portion 4*c*. Accordingly, when the occurrence of an abnormal variation is not detected by the detection unit 24 and the occurrence of an abnormal variation is detected by the detection unit 30, the determination unit 31 determines the occurrence of a specific abnormality For example, the determination unit 31 specifies a number $N_1$ of times the occurrence of an abnormal variation is detected by the detection unit 30. For example, the determination unit 31 determines the number $N_1$ of times the car 1 moves from the lowermost floor to the uppermost floor. When the occurrence of an abnormal variation is not detected by the detection unit 24, the occurrence of an abnormal variation is determined by the detection unit 30, and the foregoing specified number $N_1$ of times is larger than a reference number, the determination unit 31 determines the occurrence of an abnormality in any of the sheaves. When the occurrence of an abnormal variation is not detected by the detection unit 24, the occurrence of an abnormal variation is determined by the detection unit 30, and the foregoing specified number $N_1$ of times is smaller than the reference number, the determination unit 31 determines the occurrence of an abnormality in any of the joints between the rail members 20.

When the occurrence of a specific abnormality is determined by the determination unit 31, the operation control unit 27 stops the car 1 at a nearest floor. The notification unit 28 notifies the management company for the elevator. In the example shown in the present embodiment, it is possible to detect an abnormality in any of the joints between the rail members 20 and an abnormality in any of the sheaves.

In the example described in each of the first to third embodiments, the broken portion 4*c* occurred in the main rope 4 is detected. The break detection device may detect a broken portion occurred in another rope used for the elevator.

Figure 38:
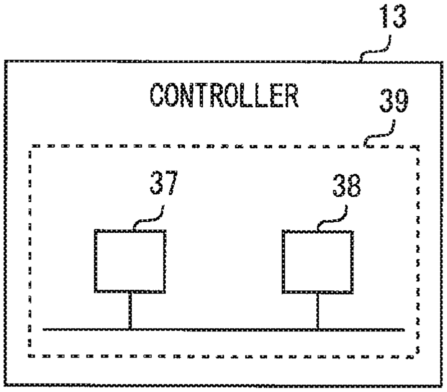
FIG. 38 is a view showing an example of a hardware element included in a controller.

In each of the first to third embodiments, each of the units denoted by the reference numerals 21 to 31 shows a function included in the controller 13. FIG. 38 is a view showing an example of a hardware element included in the controller 13. For example, the controller 13 includes, as a hardware resource, processing circuitry 39 including a processor 37 and a memory 38. A function of the storage unit 21 is implemented by the memory 38. The controller 13 implements a function of each of the units denoted by the reference numerals 22 to 31 through execution of a program stored in the memory 38 by the processor 37.

The processor 37 is referred to also as a CPU (Central Processing Unit), a central processor, a processing device, an arithmetic device, a microprocessor, a microcomputer, or a DSP. As the memory 38, a semiconductor memory, a magnetic disc, a flexible disc, an optical disc, a compact disc, a mini disc, or a DVD may also be used. Usable semiconductor memories include a RAM, a ROM, a flash memory, an EPROM, an EEPROM, and the like.

Figure 39:
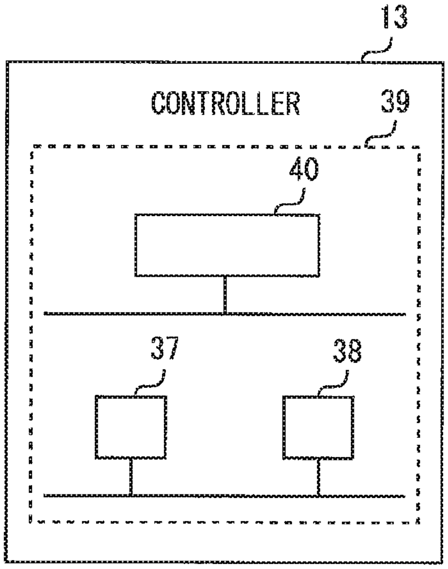
FIG. 39 is a view showing another example of the hardware element included in the controller.

FIG. 39 is a view showing another example of the hardware element included in the controller 13. In the example shown in FIG. 39, the controller 13 includes, for example, processing circuitry 39 including a processor 37, a memory 38, and dedicated hardware 40. FIG. 39 shows the example in which any of the functions of the controller 13 is implemented using the dedicated hardware 40. It may be possible to implement all the functions of the controller 13 using the dedicated hardware 40. As the dedicated hardware 40, a single circuit, a composite circuit, a programmed processor, a parallel-programmed processor, an ASIC, an FPGA, or a combination thereof can be used.

INDUSTRIAL APPLICABILITY

The break detection device according to the invention can be used to detect a broken portion occurred in a rope of an elevator.

REFERENCE SIGNS LIST

1 car, 2 shaft, 3 counterweight, 4 main rope, 4*a* end portion, 4*b* end portion, 4*c* broken portion, 5 suspension sheave, 6 suspension sheave, 7 return sheave, 7*a* shaft, 8 driving sheave, 9 return sheave, 10 suspension sheave, 11 traction machine, 12 load weighing device, 13 controller, 15 governor, 16 governor rope, 17 governor sheave, 18 encoder, 19 rope guide, 19*a* facing portion, 19*b* facing portion, 20 rail member, 21 storage unit, 22 extraction unit, 23 extraction unit, 24 detection unit, 25 car position detection unit, 26 determination unit, 26-1 reproducibility determining function, 26-2 break determining function, 27 operation control unit, 28 notification unit, 29 arithmetic unit, 30 detection unit, 31 determination unit, 32 band-pass filter, 33 amplifier, 34 low-pass filter, 35 subtractor, 36 high-pass filter, 37 processor, 38 memory, 39 processing circuitry, 40 dedicated hardware

The invention claimed is:

1. A break detection device comprising:

a sensor of which an output signal varies when vibration occurs in a rope of an elevator; and processing circuitry configured to extract, from the output signal from the sensor, a vibration component in a specific frequency band;

to attenuate, from the extracted vibration component using low-pass filters, a steady vibration component and a progressively increasing vibration component to extract a determination signal;

to detect, on the basis of the extracted determination signal, occurrence of an abnormal variation in the output signal from the sensor; and to determine, when the occurrence of the abnormal variation is detected, whether or not the rope has a broken portion on the basis of a position of a car of the elevator at an occurrence time of the abnormal variation, wherein a section in which the car moves is imaginarily divided into a plurality of vertically consecutive unit sections, and the determination signal is extracted so as to correspond to each of the unit sections with each of the low-pass filters corresponding to a different one of the unit sections.

2. The break detection device according to claim 1, wherein the circuitry includes:

a band-pass filter to which the output signal from the sensor is input;

the low-pass filters to which an output signal from the band-pass filter is input; and a subtractor configured to output, as the determination signal, a differential signal between the output signal from the band-pass filter and an output signal from each of the low-pass filters.

3. The break detection device according to claim 2, wherein the circuitry includes the low-pass filters and the subtractor, the circuitry includes, as the low-pass filters, a first filter, a second filter, and a third filter, the output signal from the band-pass filter when the car moves in a first unit section is input to the first filter, the output signal from the band-pass filter when the car moves in a second unit section is input to the second filter, and the output signal from the band-pass filter when the car moves in a third unit section is input to the third filter.

4. The break detection device according to claim 3, wherein the subtractor outputs a differential signal between the output signal from the band-pass filter and an output signal from the first filter when the car moves in the first unit section, the subtractor outputs a differential signal between the output signal from the band-pass filter and an output signal from the second filter when the car moves in the second unit section, and the subtractor outputs a differential signal between the output signal from the band-pass filter and an output signal from the third filter when the car moves in the third unit section.

5. The break detection device according to claim 3, wherein the second unit section is a unit section immediately below the first unit section and immediately above the third unit section, and the subtractor outputs a differential signal between the output signal from the band-pass filter and one of an output signal from the first filter, an output signal from the second filter, and an output signal from the third filter which has a largest value when the car moves in the second unit section.

6. The break detection device according to claim 1, wherein the rope is wound around a sheave, a rope guide for the sheave is provided, the rope guide includes a first facing portion and a second facing portion each facing the rope, and a height of each of the unit sections is larger than a rope length of a section of the rope between a portion of the rope facing the first facing portion and a portion of the rope facing the second facing portion.

7. The break detection device according to claim 1, wherein movement of the car is guided by a guide rail, the guide rail includes a plurality of rail members each having the same length, and a height of each of the unit sections is smaller than the length of each of the rail members.

8. The break detection device according to claim 2, wherein movement of the car is guided by a guide rail, the circuitry includes the low-pass filters and the subtractor, a time constant of each of the low-pass filters is set to a first set value, and the first set value is determined on the basis of a number of travels of the car required by a value of a variation occurred in the output signal from the sensor to return from an abnormal value to a normal value as a result of a supply of oil to the guide rail.

9. The break detection device according to claim 8, wherein when the number of travels of the car exceeds a reference number after the supply of the oil to the guide rail, the time constant of each of the low-pass filters is changed from the first set value to a second set value larger than the first set value.

10. The break detection device according to claim 1, wherein when a value of the determination signal exceeds a first threshold, the occurrence of the abnormal variation in the output signal from the sensor is detected.

11. The break detection device according to claim 1, wherein the circuitry is configured to store, when the occurrence of the abnormal variation is detected, a position of the car of the elevator at the occurrence time of the abnormal variation, and the circuitry is configured to determine, on the basis of a frequency with which the occurrence of the abnormal variation is detected when the car passes the stored position, whether or not the rope has the broken portion.

12. The break detection device according to claim 1, wherein:

the circuitry is configured to store, when the occurrence of the abnormal variation is detected, a position of the car of the elevator at the occurrence time of the abnormal variation in association with a determination score, the circuitry is configured to increase the determination score when the occurrence of the abnormal variation is detected when the car passes the stored position, and reduce the determination score when the occurrence of the abnormal variation is not detected when the car passes the stored position, and wherein the circuitry is configured to determine, on the basis of the determination score, whether or not the rope has the broken portion.

13. The break detection device according to claim 1, wherein:

the circuitry is configured to detect, on the basis of the extracted vibration component, occurrence of an abnormal variation in the output signal from the sensor, and the circuitry is configured to determine an abnormality in a joint between rails or an abnormality in a sheave when the occurrence of the abnormal variation is not detected from the extracted determination signal and the occurrence of the abnormal variation is determined from the extracted vibration component.

14. The break detection device according to claim 1, wherein the output signal from the sensor is a torque signal from a traction machine having a driving sheave around which the rope is wound, a load signal from a load weighing device configured to detect a load of the car, or a speed deviation signal corresponding to a difference between a command value for a rotation speed of the driving sheave and an actually measured value.

* * * * *